(12) United States Patent  (10) Patent No.: US 7,661,766 B2
Davis et al.  (45) Date of Patent: Feb. 16, 2010

(54) RIM ASSEMBLY WITH OSCILLATOR

(76) Inventors: Jon R. Davis, 670 Gran Heritage Way, Dacula, GA (US) 30019; Ian D. Kovacevich, 235 Meadowbrook Rd., Charlotte, NC (US) 28211; Chris Hoy, 1441 Rumstone Lanes, Charlotte, NC (US) 28262; Daniel Lee Bizzell, P.O. Box 2409, Davidson, NC (US) 28036; Tom Philpott, 1811 Kensington Dr., Charlotte, NC (US) 28205; Andrew Peeler, 726 Farm Rd., Shelby, NC (US) 28152; Andrew Donati, 6129 Wakehurst Rd., Charlotte, NC (US) 28226

( * ) Notice: Subject to any disclaimer, the term of this patent is extended or adjusted under 35 U.S.C. 154(b) by 0 days.

(21) Appl. No.: 11/464,475

(22) Filed: Aug. 14, 2006

(65) Prior Publication Data

US 2008/0036285 A1 Feb. 14, 2008

(51) Int. Cl.
*B60B 7/04* (2006.01)
(52) U.S. Cl. .............................. 301/37.25; 301/37.108
(58) Field of Classification Search .............. 301/37.25, 301/37.101, 37.102, 37.108, 37.28, 40.1, 301/41.1, 43, 45, 48; 40/587; 446/189
See application file for complete search history.

(56) References Cited

U.S. PATENT DOCUMENTS

| 3,094,800 | A | * | 6/1963 | Jungerwirth | 40/430 |
|---|---|---|---|---|---|
| 4,280,293 | A | * | 7/1981 | Kovalenko et al. | 40/587 |
| 4,593,953 | A | * | 6/1986 | Baba et al. | 301/6.3 |
| 5,487,692 | A | * | 1/1996 | Mowrer et al. | 446/465 |
| 6,120,104 | A | * | 9/2000 | Okamoto et al. | 301/37.25 |
| 6,341,825 | B1 | * | 1/2002 | Inoue et al. | 301/6.3 |
| 6,692,084 | B2 | * | 2/2004 | Inoue et al. | 301/6.3 |
| 2006/0044817 | A1 | | 3/2006 | Terry | |
| 2006/0125310 | A1 | | 6/2006 | Miansian et al. | |
| 2006/0131948 | A1 | * | 6/2006 | Holmes | 301/40.1 |
| 2007/0246996 | A1 | * | 10/2007 | Footit | 301/37.108 |

* cited by examiner

*Primary Examiner*—S. Joseph Morano
*Assistant Examiner*—Kip T Kotter
(74) *Attorney, Agent, or Firm*—Tillman Wright, PLLC; Chad D. Tillman; James D. Wright

(57) ABSTRACT

A rim assembly comprises a rim including a peripheral rim portion for the mounting of a wheel; a wheel cover affixed to the rim and configured to rotate about an axis of the rim; and an oscillator attached to the wheel cover and configured to move back and forth between a first position and a second position based on rotation of the wheel cover about the axis. The oscillator is configured to protract axially away from the wheel cover when moving from the second position toward the first position and to retract axially toward the wheel cover when moving from the first position toward the second position.

12 Claims, 17 Drawing Sheets

RIM ASSEMBLY WITH OSCILLATOR

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

Decorative rims for automobile wheels are generally known. For example, decorative rims are disclosed in the following exemplary patent references, the entire disclosure of each of which is incorporated herein by reference: U.S. Pat. No. 6,964,454 to Miansian ("Miansian"); U.S. Pat. No. 6,799,810 to Wang ("Wang"); U.S. Pat. No. 6,554,370 to Fowlkes ("Fowlkes"); U.S. Pat. No. 5,659,989 to Hsiao et al. ("Hsiao"); U.S. Patent Application Publication No. 2005/0206218 A1 to Clifford et al. ("Clifford"); U.S. Patent Application Publication No. 2005/0116530 to Simpson ("Simpson"); U.S. Patent Application Publication No. 2005/0052069 to Gilly et al. ("Gilly"); U.S. Patent Application Publication No. 2004/0232758 to Freeman ("Freeman"); and U.S. Patent Application Publication No. 2003/0102712 to Fitzgerald ("Fitzgerald").

Of these patent references, Fowlkes, for example, discloses a wheel spinner assembly wherein a spinner rotates independently relative to the rim assembly to which the spinner is mounted. Such "spinners" have become increasingly popular over recent years because of the dynamic effect that is provided. Moreover, it is believed that demand for the ability to customize a vehicle has increased dramatically in recent years. In this environment, the present invention provides another inventive approach to customization of a vehicle's wheels.

SUMMARY OF THE INVENTION

The present invention includes many aspects and features. In an aspect of the invention, a rim assembly comprises a rim including a peripheral rim portion for the mounting of a wheel; a wheel cover affixed to the rim and configured to rotate about an axis of the rim; and an oscillator attached to the wheel cover and configured to move back and forth between a first position and a second position based on rotation of the wheel cover about the axis. The oscillator is configured to protract axially away from the wheel cover when moving from the second position toward the first position and to retract axially toward the wheel cover when moving from the first position toward the second position.

In a feature of this aspect, the wheel cover is directly attached only to a central rim portion of the rim, the central rim portion being configured to mount to an axle hub of a vehicle. In another feature, the wheel cover is directly attached only to a circumferential edge portion of the rim. In yet another feature, the wheel cover is directly attached both to a central rim portion of the rim and to a circumferential edge portion of the peripheral rim portion. In an additional feature, the wheel cover defines a recess in which the oscillator extends. In accordance with this feature, the oscillator lies substantially within the recess when the oscillator is in the second position. In further accordance with this feature, the oscillator lies flush with a front surface of the wheel cover when the oscillator is in the second position.

In another feature, the rim assembly further comprises a springy member that biases the oscillator toward the first position from the second position. In yet another feature, the assembly further comprises a plurality of oscillators, each oscillator of the plurality being attached to the wheel cover and configured to move back and forth between a first position and a second position based on rotation of the wheel cover about the axis, wherein the respective oscillator is configured to protract axially away from the wheel cover when moving from the second position toward the first position and to retract axially toward the wheel cover when moving from the first position toward the second position. In accordance with this feature, each of the plurality of oscillators is biased by a springy member toward the second position from the first position of the oscillator. It is preferred that a single springy member collectively biases the plurality of the oscillators.

In an additional feature, the oscillator is mounted to the wheel cover in pivotable disposition relative thereto. With regard to this feature, the oscillator pivots between the first and second positions about an axis that is orthogonal to the axis of the rim. In yet another feature, the oscillator is mounted to the wheel cover in sliding disposition relative to the wheel cover. In accordance with this feature, the oscillator exhibits scissor-like movement in transitioning between the first and second positions.

In a further feature, the oscillator comprises a disk mounted to the wheel cover by a gimbal. It is preferred that the ring assembly further comprises a weight that is affixed to the oscillator. It is further preferred that the oscillator includes a recess in which the weight is received. It is still further preferred that the weight is removably affixed to the oscillator.

In another feature, the rim assembly further comprises a second oscillator that is attached to the wheel cover and is configured to move back and forth between a first position and a second position based on rotation of the wheel cover about the axis, wherein the oscillator is configured to protract axially away from the wheel cover when moving from the second position toward the first position and to retract axially toward the wheel cover when moving from the first position toward the second position. The second oscillator is different in structural design from the other oscillator.

In yet another feature, the rim assembly further comprises a plurality of oscillators, a single spring, and a cam follower disposed between the spring and the plurality of oscillators, wherein each of the plurality of oscillators includes a cam surface that abuts the cam follower and wherein the spring exerts a spring force against the cam follower. In an additional feature, the oscillator begins transitioning from the second position toward the first position only once a first threshold angular velocity of the rim has been reached. With regard to this feature, the first threshold angular velocity corresponds to a vehicular speed of between 10 miles per hour and 30 miles per hour. With further regard to this feature, the oscillator completes its transition from the second position to the first position only once a second threshold angular velocity of the rim is reached or exceeded, the second threshold angular velocity being greater than the first threshold angular velocity of the rim. In accordance with this feature, the second threshold angular velocity corresponds to a vehicular speed of between 10 miles per hour and 30 miles per hour.

In another aspect of the invention, a vehicle includes a rim assembly comprising a rim including a peripheral rim portion for the mounting of a wheel; a wheel cover affixed to the rim and configured to rotate about an axis of the rim; and an oscillator attached to the wheel cover and configured to move back and forth between a first position and a second position based on rotation of the wheel cover about the axis, wherein the oscillator is configured to protract axially away from the wheel cover when moving from the second position toward the first position and to retract axially toward the wheel cover when moving from the first position toward the second position.

In yet another aspect of the invention, a wheel cover for affixing to a rim assembly comprises an oscillator attached to the wheel cover and configured to move back and forth between a first position and a second position based on rotation of the wheel cover about an axis thereof, wherein the oscillator is configured to protract in an axial direction away from the wheel cover when moving from the second position toward the first position and to retract in an axial direction toward the wheel cover when moving from the first position toward the second position.

In still yet another aspect of the invention, a rim assembly for enhancing the visual effect of a wheel when rotating comprises an oscillator attached to a rim and configured to move back and forth between a first position and a second position based on rotation of the rim about an axis thereof. The oscillator is configured to protract in an axial direction away from the rim when moving from the second position toward the first position and to retract in an axial direction toward the rim when moving from the first position toward the second position.

In addition to the aforementioned aspects and features of the present invention, it should be noted that the present invention further includes the various possible combinations of such aspects and features.

BRIEF DESCRIPTION OF THE DRAWINGS

Further aspects, features, embodiments, and advantages of the present invention will become apparent from the following detailed description with reference to the drawings, wherein.

DETAILED DESCRIPTION

Figure 1:
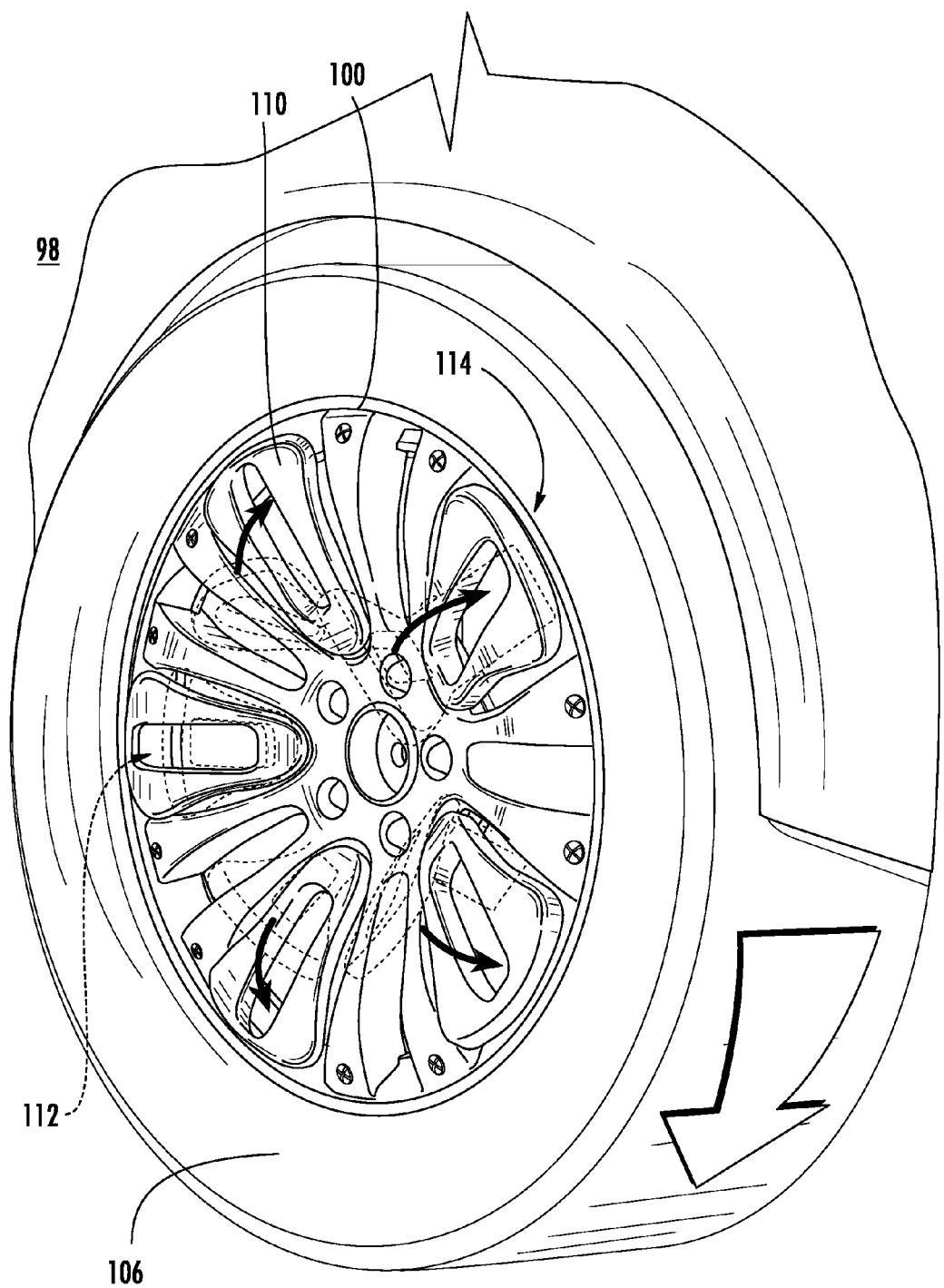
FIG. 1 is a perspective view of a wheel 98 including a tire 106 mounted on a rim assembly 100 in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Additionally, as used herein, the term "oscillator" is broadly intended to refer to something that moves back and forth between at least two positions over time, whether such motion is continuous or discontinuous. With regard to a rim assembly, the oscillating movement at least includes axial movement away from and back toward a wheel such as, for example, a center portion of a rim assembly mounted to the axle hub of a vehicle. The oscillating movement further may include radial and/or angular components as well, as illustrated in the drawings.

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

First Embodiment

Figure 2:
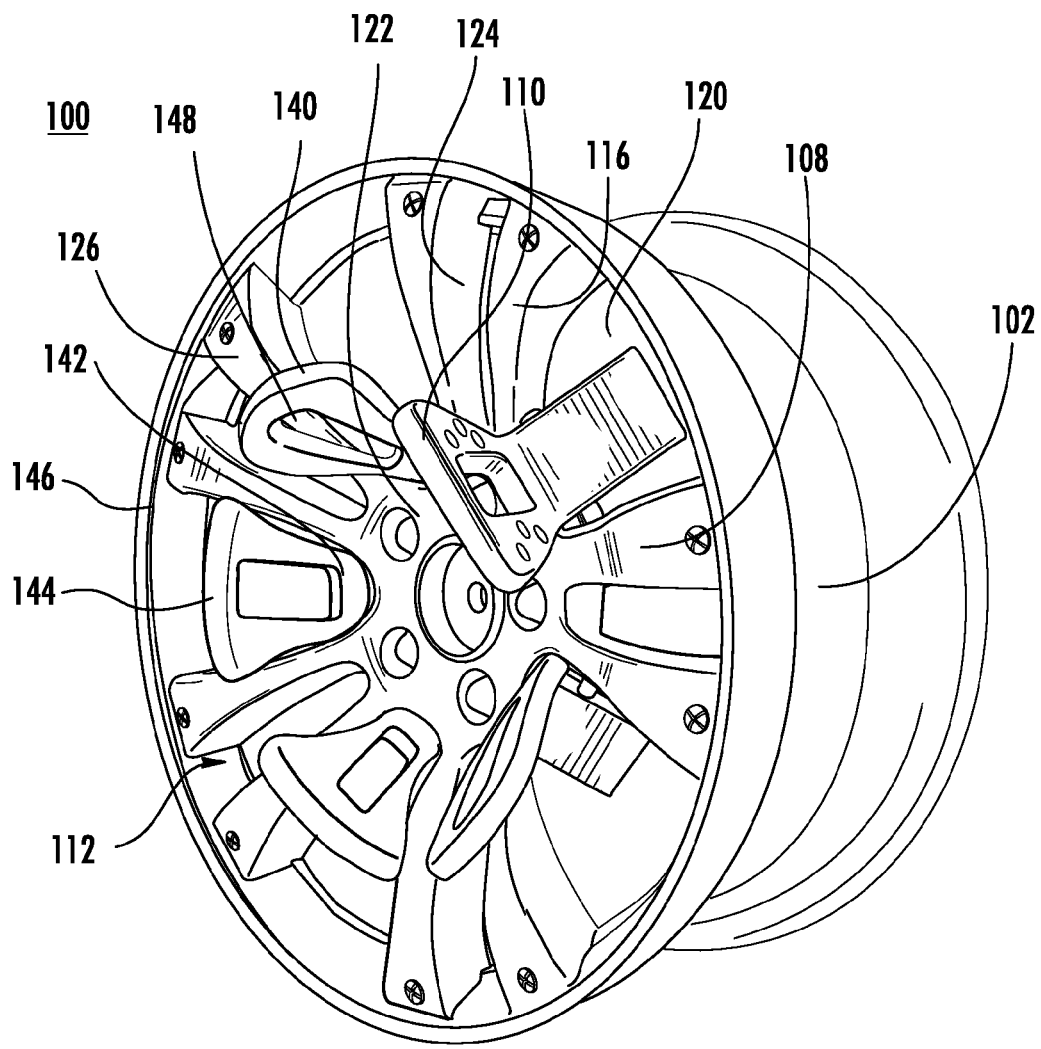
FIG. 2 is a perspective view of the rim assembly 100 of FIG. 1, wherein each oscillator 110 of the rim assembly 100 is illustrated in a respective first position.
Figure 3:
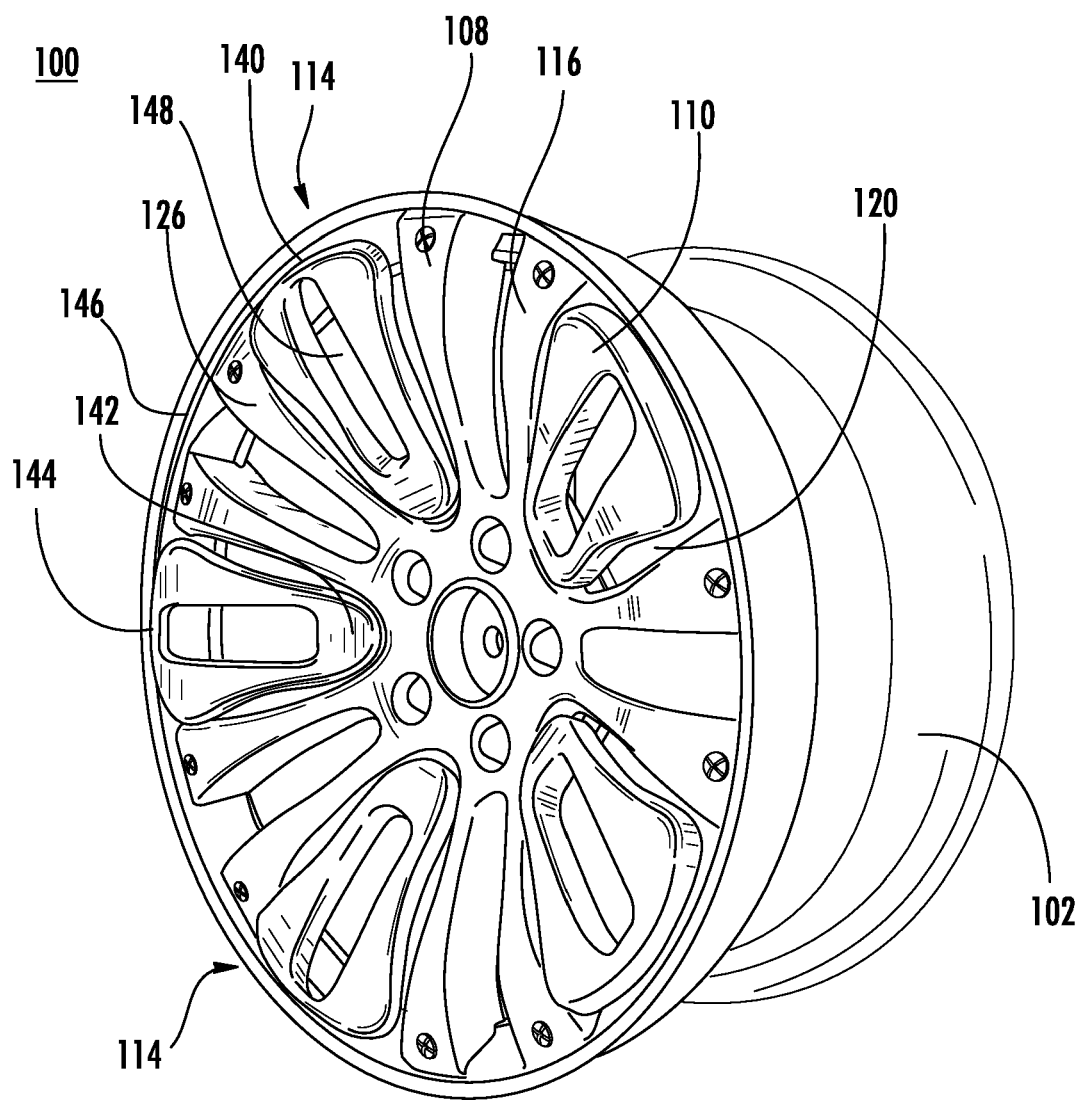
FIG. 3 is a perspective view of the rim assembly of FIG. 1, wherein each oscillator 110 of the rim assembly 100 is illustrated in a respective second position.
Figure 4:
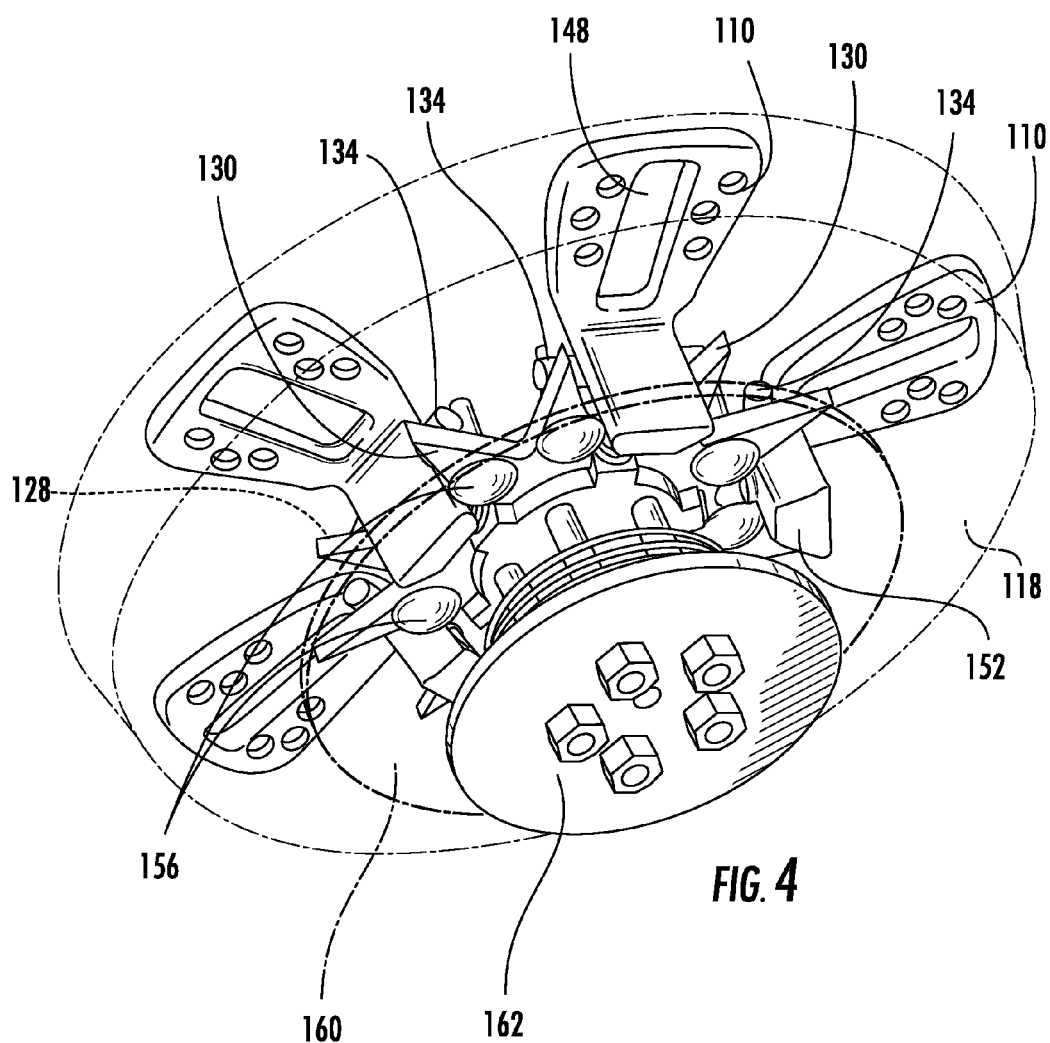
FIG. 4 is a perspective view of a subassembly of the rim assembly 100.
Figure 5:
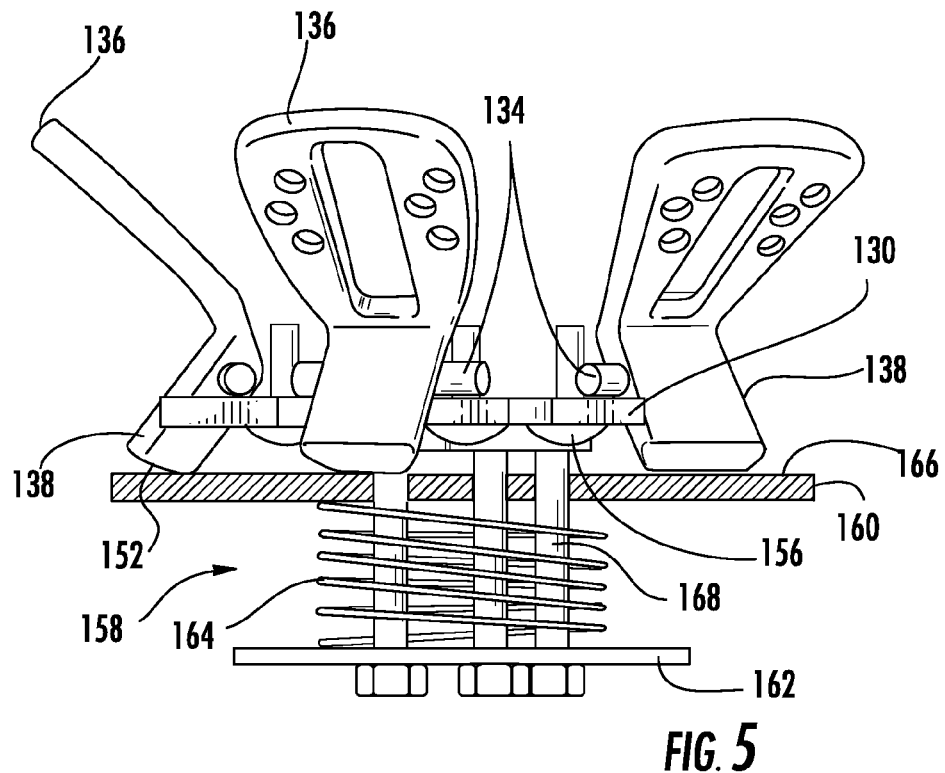
FIG. 5 is a partial cross-sectional view of the subassembly of FIG. 4 wherein each oscillator is in the first position.
Figure 6:
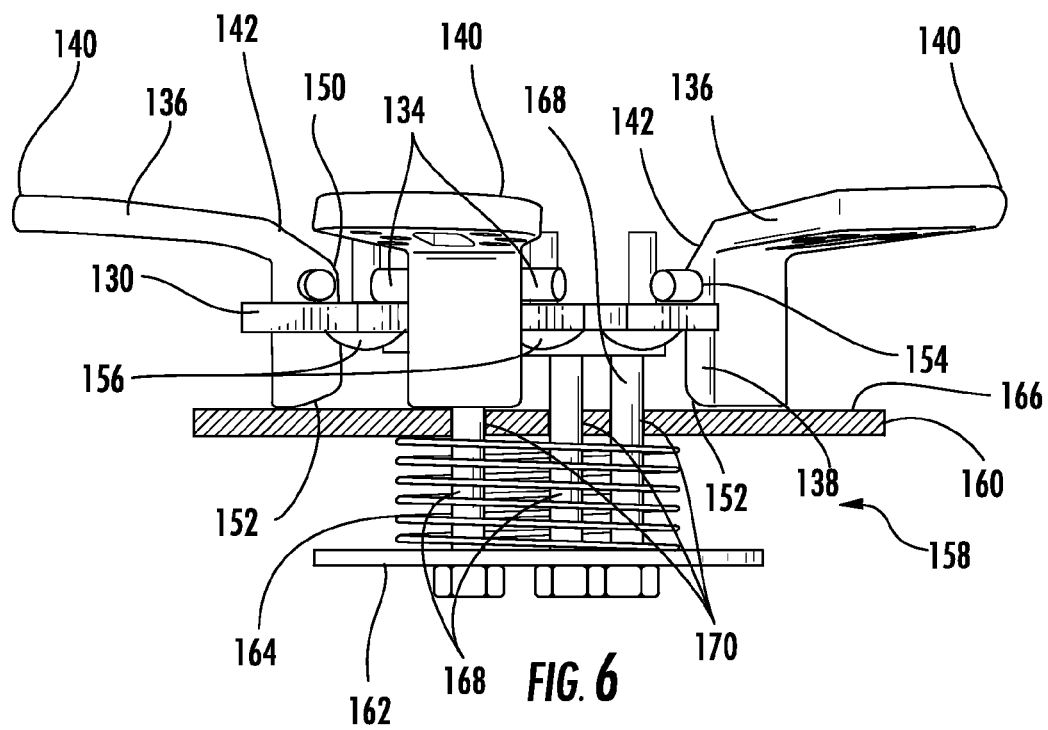
FIG. 6 is a partial cross-sectional view of the subassembly of FIG. 4 wherein each oscillators is in the second position.

A rim assembly 100 in accordance with a first embodiment of the present invention will now be described in detail with reference to FIGS. 1-6. In this respect, FIG. 1 is a perspective view of a wheel 98 including a tire 106 mounted on the rim assembly 100; FIG. 2 is a perspective view of the rim assembly 100 itself, wherein each oscillator 110 of the rim assembly 100 is illustrated in a respective first position; FIG. 3 is a perspective view of the rim assembly wherein each oscillator 110 of the rim assembly 100 is illustrated in a respective second position; FIG. 4 is a perspective view of a subassembly of the rim assembly 100; FIG. 5 is a partial cross-sectional view of the subassembly of FIG. 4 wherein each oscillator 110 is in the first position; and FIG. 6 is a partial cross-sectional view of the subassembly of FIG. 4 wherein each oscillator 110 is in the second position.

The rim assembly 100 includes a peripheral rim portion 102 on which the tire 106 is mounted in conventional manner.

The rim assembly 100 also includes a central rim portion having lug holes for receipt therethrough of lug studs for mounting of the central rim portion to a hub of an axle of an automobile. The mounting preferably is accomplished with lug nuts. While not shown, such mounting of a central rim portion to an axle hub is conventional and is disclosed, for example, in FIG. 3 of Clifford, which publication has been incorporated herein by reference. Furthermore, while the rim assembly 100 is intended to be used with an automobile, it will be understood by the Ordinary Artisan that various embodiments of the invention are applicable to any wheeled vehicle including, for example, and not by way of limitation: a motorcycle; an all terrain vehicle (ATV); a bicycle; a trailer; and a golf cart.

Figure 19:
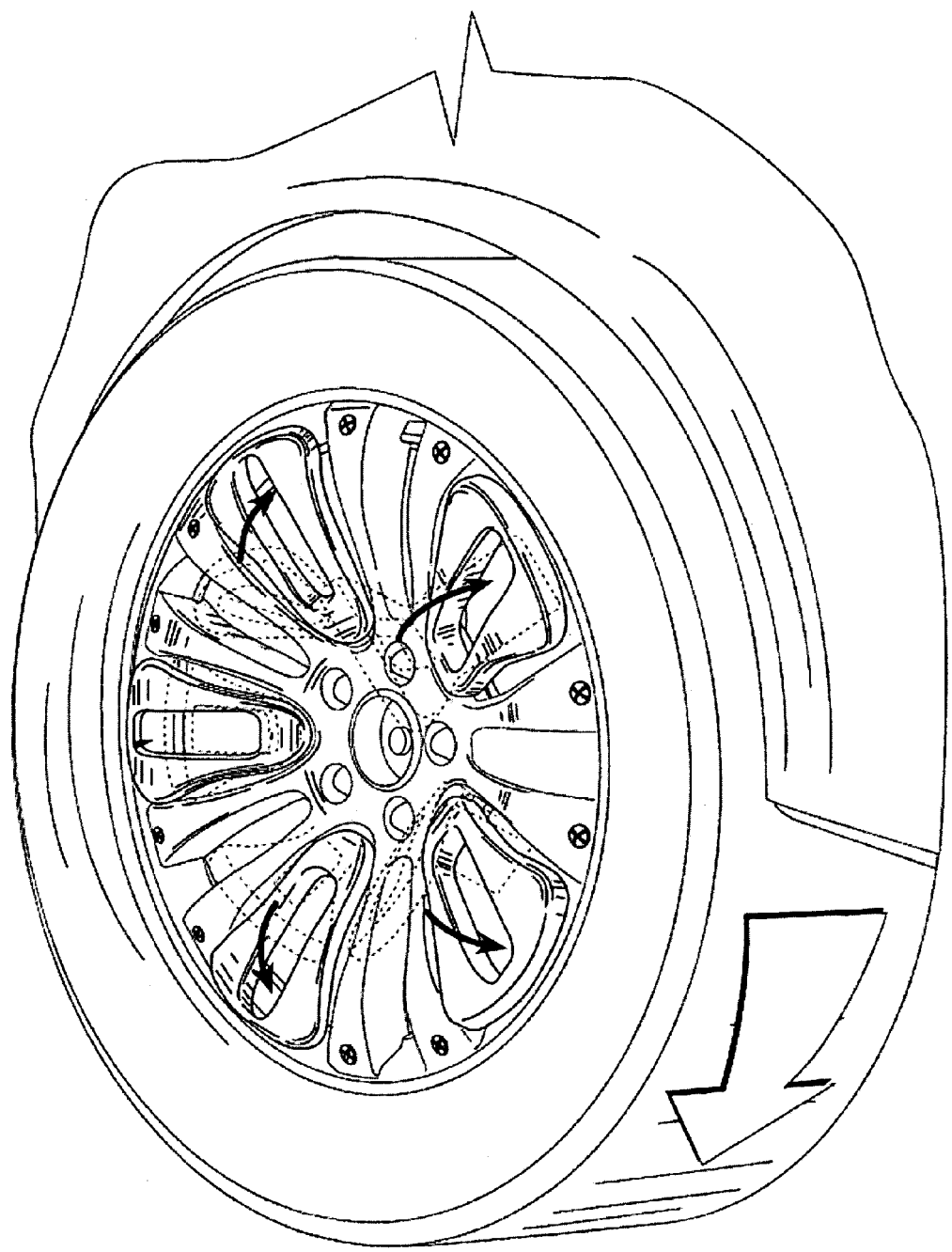
FIG. 19 is a perspective view illustrating how a wheel cover can be directly attached to a central portion of a rim assembly.
Figure 20:
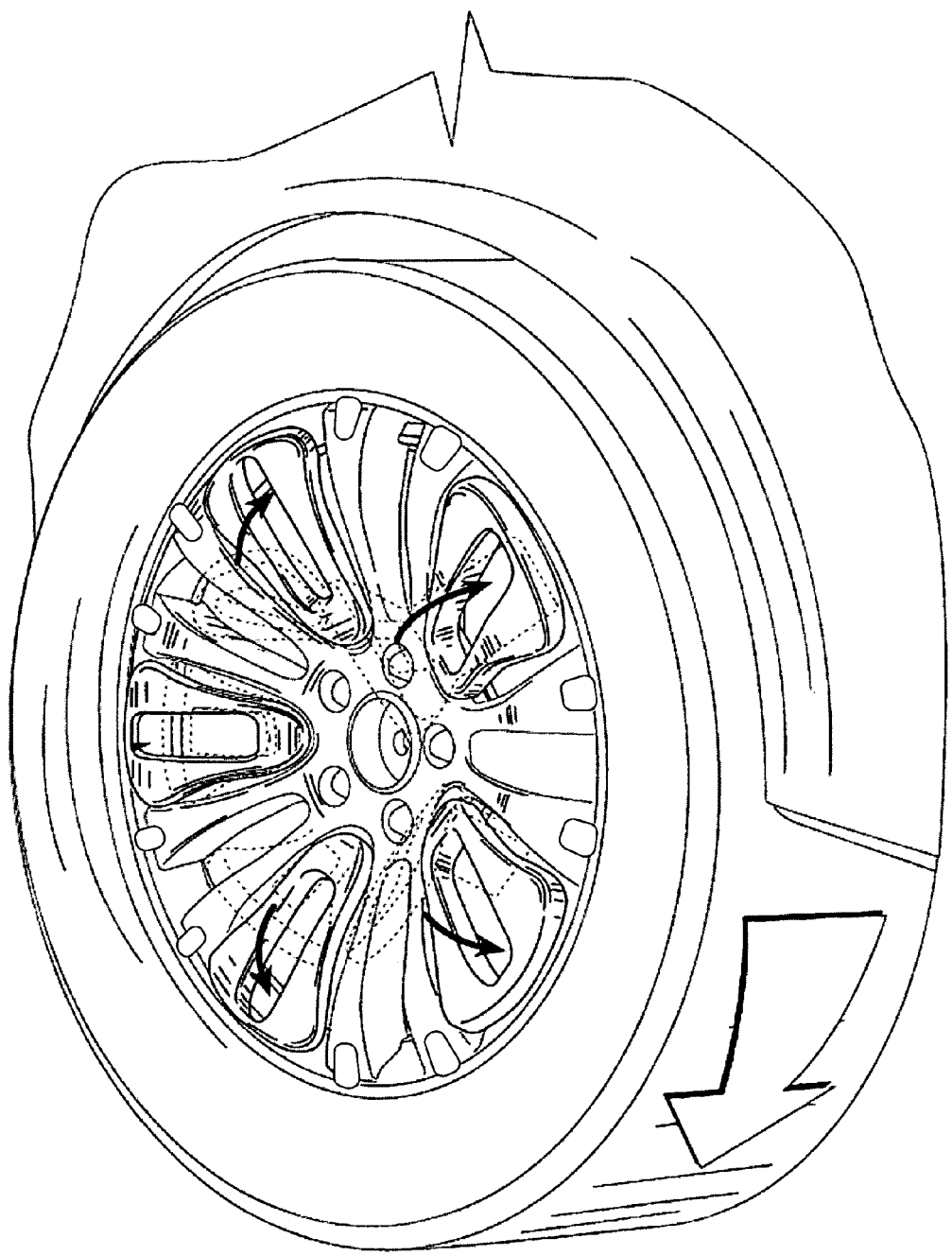
FIG. 20 is a perspective view illustrating how a wheel cover can be directly attached to a circumferential edge portion of a rim.
Figure 21:
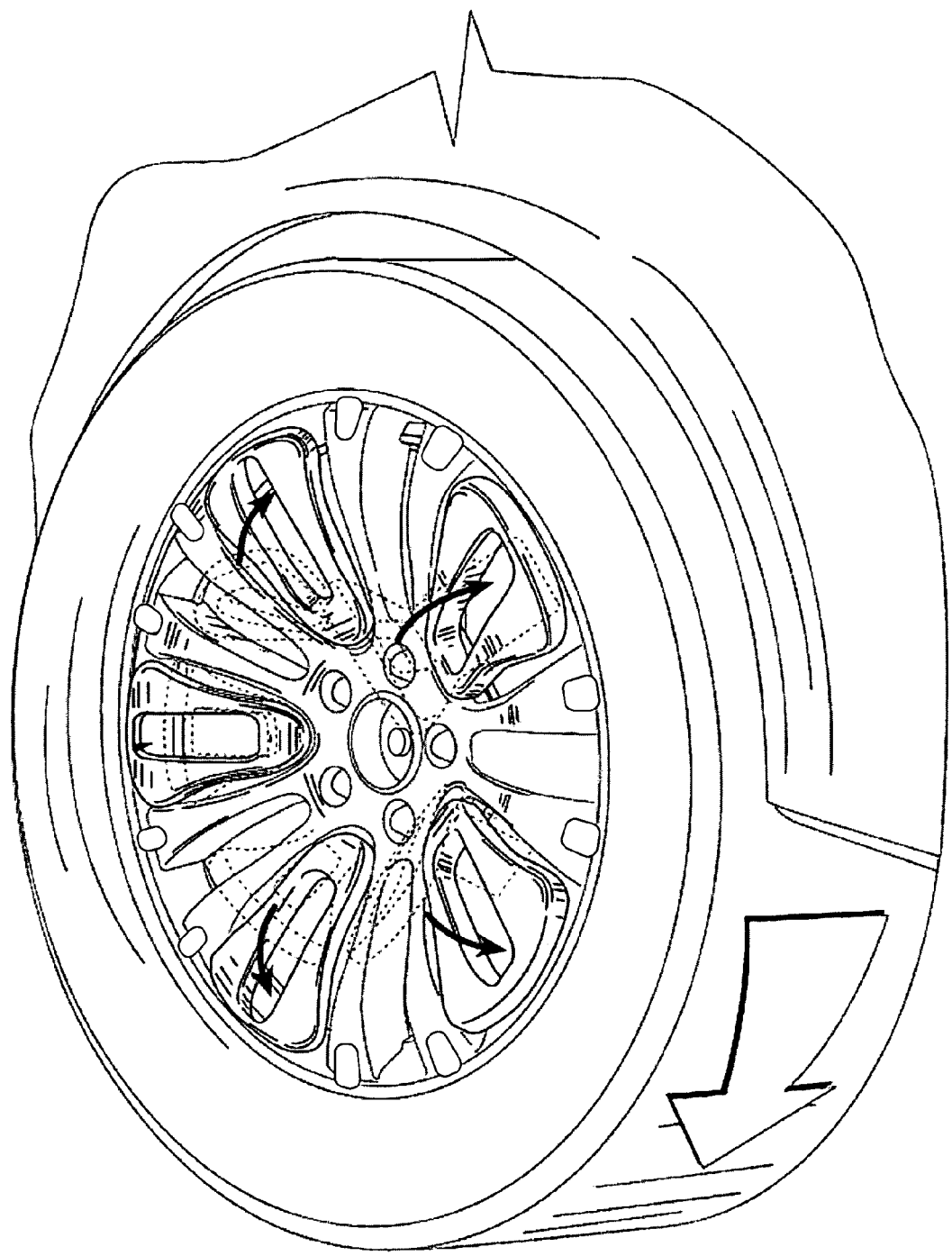
FIG. 21 is a perspective view illustrating how a wheel cover can be directly attached to both a central portion of a rim and a circumferential edge portion of a peripheral rim portion.

The rim assembly 100 further includes a wheel cover 108 that is disposed in covering relation to the central rim portion and the mounting of the rim assembly 100 to an axle hub. The wheel cover 108 is mounted in fixed disposition relative to the peripheral rim portion 102 and, subsequently, rotates in unison therewith during rotation of the tire 106. A central axial opening shown, for example, in FIGS. 1 and 4, extends completely through the wheel covering 108, and the wheel cover 108 may be attached to a central portion of the rim assembly 100 by extending a fastener through the central axial opening. FIG. 19 is a perspective view illustrating how a wheel cover can be directly attached to a central portion of a rim assembly. Alternatively, the wheel cover 108 may be fastened to a circumferential edge 146 of the peripheral rim portion 102. Such mounting of a wheel cover to a circumferential edge of a peripheral rim portion is conventional and is disclosed, for example, in FIG. 6 of Hsiao, which patent has been incorporated herein by reference. Further, FIG. 20 is a perspective view illustrating how a wheel cover can be directly attached to a circumferential edge portion of a rim. In either scenario, the wheel cover 108 is fixed for rotation with the peripheral rim portion 102 and tire 106. FIG. 21 is a perspective view illustrating how a wheel cover can be directly attached to both a central portion of a rim and a circumferential edge portion of a peripheral rim portion.

The wheel cover 108 is round and includes a front side 116 and a back side 118. The front side 116 includes a slightly concave contour with a slightly recessed central area 122. The back side 118 of the wheel cover 108 includes a central recessed area 128 that is dimensioned to receive a back plate 130. The back plate 130 fits within the central recessed area 128 of the wheel cover 108 and is mounted in fixed disposition to the wheel cover 108 by a plurality of bolts 156.

The rim assembly 100 also includes a plurality of oscillators 110 disposed on and arranged about a center of the wheel cover 108. In the rim assembly 100 that is illustrated, five oscillators 110 are shown and it is preferred that the number of oscillators 110 be an odd number; however, the number of oscillators may be more or less—and may be an even number, as desired.

To accommodate the oscillators 110, the wheel cover 108 includes a plurality of recesses 120 in the front side 116 through which the oscillators 110 extend. The recesses 120 may extend completely through the wheel cover 108. The recesses 120 and oscillators 110 radiate from the central area 122. A plurality of slots 124 are interposed between the recesses 120 and also radiate from the central area 122. The recesses 120 and slots 124 are disposed in alternating manner around the central area 122 of the wheel cover 108. A plurality of radially extending arms 126 extend from the central area 122 to the circumference of the wheel cover 108 and define the side boundaries of the recesses 120 and the slots 124.

Each oscillator 110 is disposed in movable disposition relative to the wheel cover 108. In this regard, each oscillator 110 is movable between a first position 112 and a second position 114. When an oscillator 110 is in the first position 112, the oscillator 110 protrudes generally in an axially direction away from the front side 116 of the wheel cover 108. Conversely, when an oscillator 110 is in the second position, the oscillator 110 preferably lies flush with the front side 116 of the wheel cover 108 and does not protrude from the respective recess of the wheel cover 108 within which the oscillator 110 extends.

With further detail to the oscillators, each oscillator 110 includes an extension portion 136 and an actuation portion 138. The extension portion 136 and actuation portion 138 are integrally connected to one another and extend generally orthogonal to one another.

The extension portion 136 has a proximal end 142 and a distal end 144, with the distal end 144 being nearer to the circumferential edge 146 of the peripheral rim portion 102 when the oscillator 110 is in the second position 114. Furthermore, the extension portion 136 is generally flat and includes a profile 140 that flares outwardly as it extends from the proximal end 142 to the distal end 144. Specifically, the profile 140 is wider at the distal end 144 than at the proximal end 142. The profile 140 also includes rounded corners. An elongate opening 148 further is located radially along the extension portion 136.

The actuation portion 138 generally extends along an axial direction away from the back side 118 of the wheel cover 108 when the oscillator 110 is in the first position 112. The actuation portion 138 includes a proximal end 150 and a distal end that is curved to define cam surface 152. The actuation portion 138 also includes an aperture 154 that extends completely through the actuation portion 138 adjacent the proximal end 150. A connection pin 134 extends through the aperture 154 and is received within coaxial recesses (not shown) in adjacent radially extending arms 126 of the wheel cover 108. The connection pin 134 thereby affixes the oscillator 110 to the wheel cover 108 such that the oscillator 110 may pivot along the axis of the connection pin 134 relative to the wheel cover 108. In particular, the oscillator 110 is able to move between the first position 112 and the second position 114 by pivoting about the axis of the connection pin 134.

The rim assembly 100 also includes a spring assembly 158. The spring assembly 158 includes a proximal spring support plate 160, a distal spring support plate 162, and a spring 164 disposed therebetween. The spring support plates 160,162 are arranged such that horizontal planes of the support plates 160,162 are parallel to each other and, preferably, to a horizontal plane of the back plate 130. The spring support plates 160,162 are both round, with the proximal spring support plate 160 having a larger diameter than the distal spring support plate 162. The proximal spring support plate 160 is disposed nearer to the back plate 130 than the distal spring support plate 162.

The spring support plates 160,162 are mounted for sliding disposition relative to each other. In particular, rods 168 extend through a plurality of openings 170 in the spring support plates 160,162 such that the spring support plates 160,162 may slide in an axial direction thereon. The spring 164 is in the form of a single compression coil spring and is interposed between the two spring support plates 160,162 and biases the two spring support plates 160,162 apart on the rods 168, which rods 168 extend within the coils of the spring 164. Nuts are attached to the distal ends of the rods 168 and retain the distal support plate 162 thereon. The rods 168 furthermore are affixed to the back plate 130 and serve to connect the spring assembly 158 to the back plate 130, which in turn, is connected to the wheel cover 108 and thereby connects the spring assembly 158 to the wheel cover 108.

The proximal spring support plate 160 is able to slide axially along the plurality of rods 168, and the spring 164 is sufficiently compressed so as to bias the proximal spring support plate 160 away from the distal spring support plate 162 and into continuous engagement with the cam surfaces 152 of the oscillators 110 whether in the first position 112 or the second position 114. Each cam surface 152 of the oscillators 110 is thereby maintained in abutment with a planar surface 166 of the proximal spring support plate 160.

Operation

In operation, movement of the oscillator 110 from the first position 112 toward the second position 114 generally is caused by rotation of the wheel cover 108, which results in compression of the spring 164. Specifically, during rotation of the wheel cover 108, centrifugal force acts upon the distal end 144 of the extension portion 136 of each of the oscillators 110. At a first threshold angular velocity, the magnitude of the centrifugal force will be sufficient to begin to cause the distal end 144 of the extension portion 136 of each of the oscillators 110 to move toward the front side 116 of the wheel cover 108. This motion is accomplished by pivoting of the oscillator 110 about the connection pin 134, which mounts the oscillator 110 on the radial arms 126 of the wheel cover 108. At a second threshold angular velocity, the magnitude of the centrifugal force will be sufficient to cause the oscillators 110 to move into the second position 114, wherein the extension portion 136 of each of the oscillators 110 will lie flush with the front side 116 of the wheel cover 108. For purposes of commercial embodiments of the rim assembly 100 of the present invention, it is preferred that the first and second threshold angular velocities correspond to vehicular speeds of between approximately 10 miles per hour to 30 miles per hour.

The pivoting of the oscillators 110 from the first position 112 toward the second position 114 causes the proximal spring support plate 160 to move toward the distal spring support plate 162, thereby compressing the spring 164. Specifically, rotation of the cam surfaces 152 of the oscillators 110 displaces the proximal spring support plate 160 toward the distal spring support plate 162. When the second threshold angular velocity is no longer maintained or exceeded, the magnitude of the centrifugal force will no longer be sufficient to maintain the compression of the spring 164, and the spring 164 will begin to decompress. Decompression of the spring 164 displaces the proximal spring support plate 160 away from the distal spring support plate 162 and, in turn, rotation of the cam surfaces 152 of the oscillators 110 and protraction of the extension portions 136 of the oscillators 110.

In view of the foregoing, it will be appreciated by the Ordinary Artisan that: when an automobile having the rim assembly 100 is at rest, the oscillators 110 generally will be disposed in the first position 112, i.e., protruding from the front side 116 of the wheel cover 108; during acceleration of the vehicle, the oscillators will begin to retract into the wheel covers when at a particular speed is reached by the vehicle; and if and when a second particular speed is achieved, the oscillators will be fully retracted within the wheel covers. Moreover, it will be appreciated that, during the two particular speeds, the oscillators will be partially extended to varying degrees depending on the speed of the vehicle.

It will also be appreciated by the Ordinary Artisan that the particular speeds (and, thus, the threshold angular velocities) may be varied based on the properties of the spring 164 of the rim assembly 100. A spring having a greater spring constant will require higher threshold levels, and a spring having a lower spring constant will lower threshold levels.

Similar variation can be achieved by altering the weight of the distal end 144 of the extension portion 136 of each of the oscillators 110. In this respect, the distal end 144 of each extension portion 136 of each of the oscillators 110 preferably includes a plurality of cylindrical recesses adapted to receive therein cylindrical weights in tight frictional fit. Six cylindrical recesses are shown disposed in the underside of each extension portion 136 of each of the oscillators 110. By installing weights in a desired number of the cylindrical recesses of the oscillators 110, the threshold angular velocities may be altered. Moreover, as will be further appreciated by the Ordinary Artisan, the oscillators 110 of a rim assembly 100 may be weighted similarly or dissimilarly, thereby further adjusting to a finer degree the threshold angular velocities.

Because the threshold angular velocities may be so varied, a user can fine tune each rim assemblies 100. Moreover, a user may select to have all four rim assemblies actuate at the same threshold angular velocities or may select to have each of four rim assemblies actuate at completely different threshold angular velocities, or combination thereof. For example, sixteen possible sequences exist for initial actuation (i.e., the beginning of oscillator retraction) of the four group of oscillators corresponding to the four wheels of an automobile. Such customizability is advantageous and provides yet further, individualized customization of a vehicle's wheels for cruising and the like according to one's desires.

Second Embodiment

Figure 7:
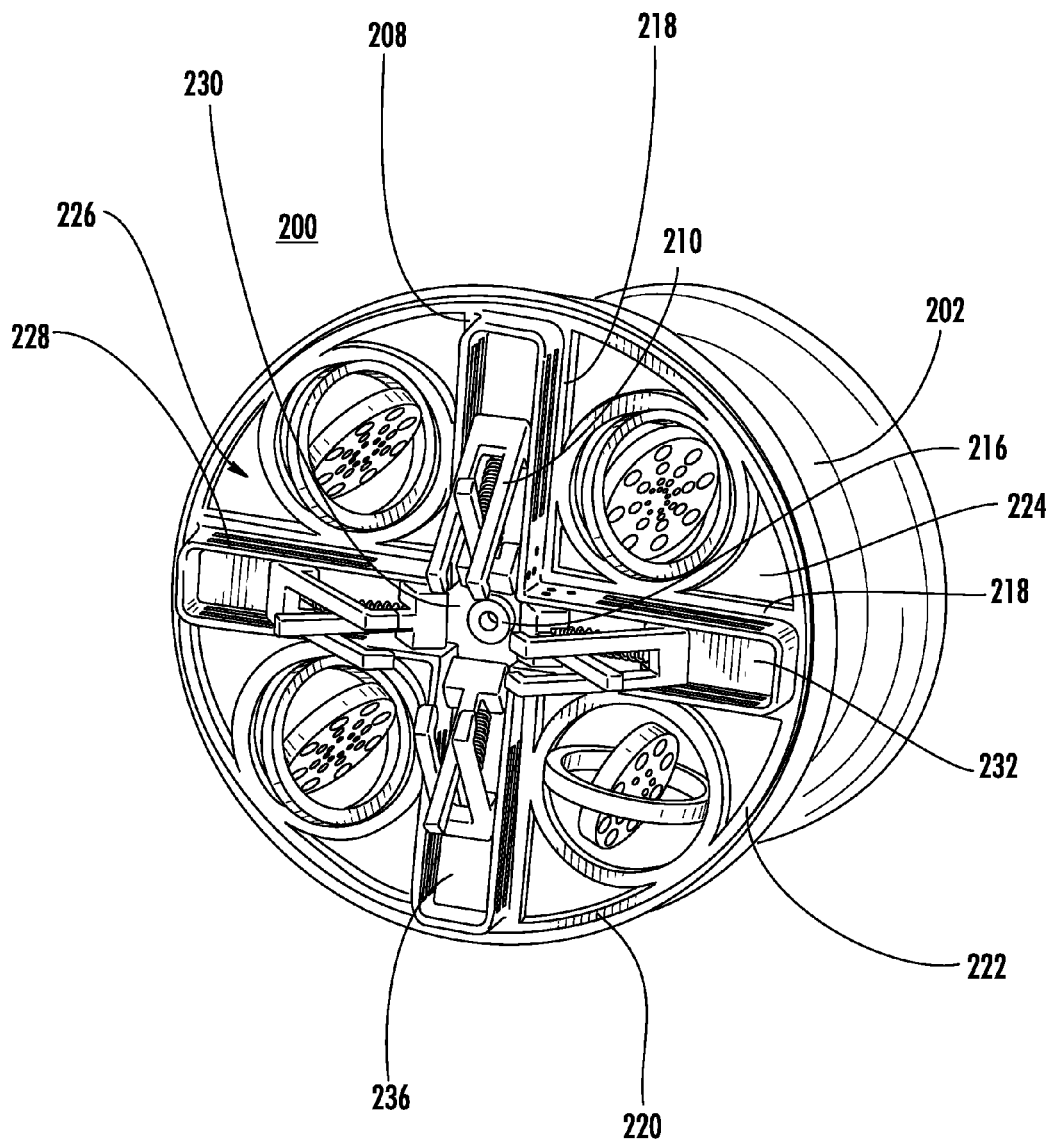
FIG. 7 is a perspective view of a rim assembly 200 in accordance with a second preferred embodiment of the present invention.
Figure 8:
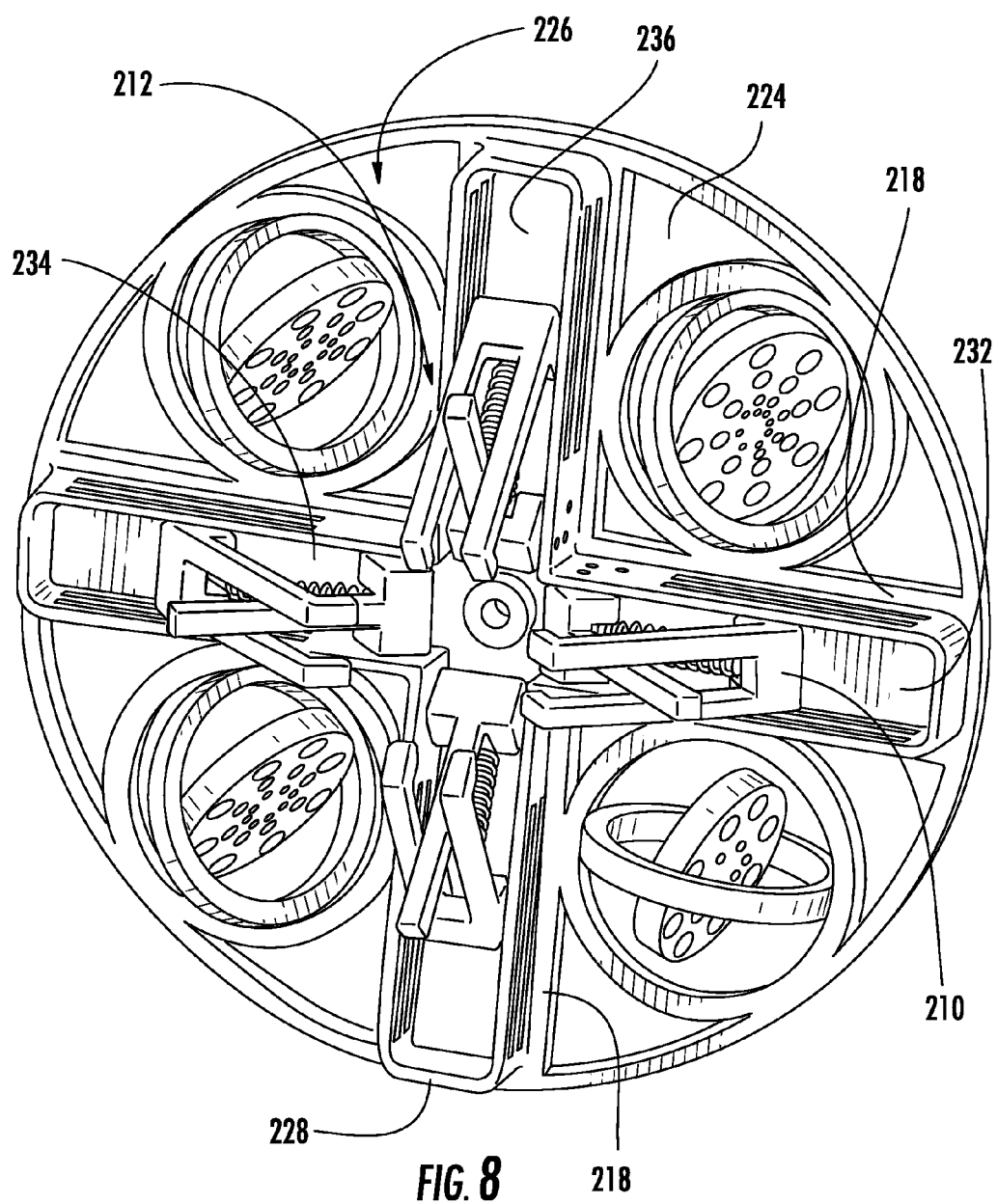
FIG. 8 is a closer perspective view of the wheel cover of the rim assembly 200 of FIG. 7.
Figure 9:
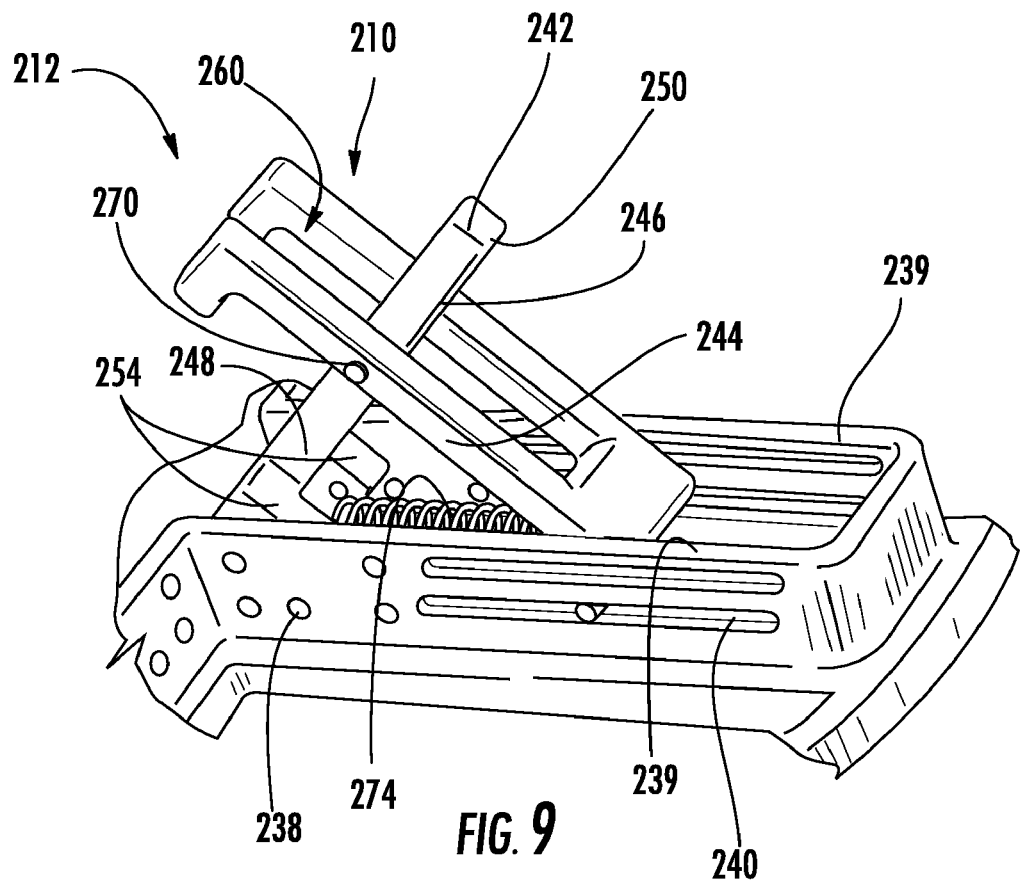
FIG. 9 is a perspective view of an oscillator 210 of the rim assembly 200 of FIG. 7 wherein the oscillator 210 is in a first position 212.
Figure 10:
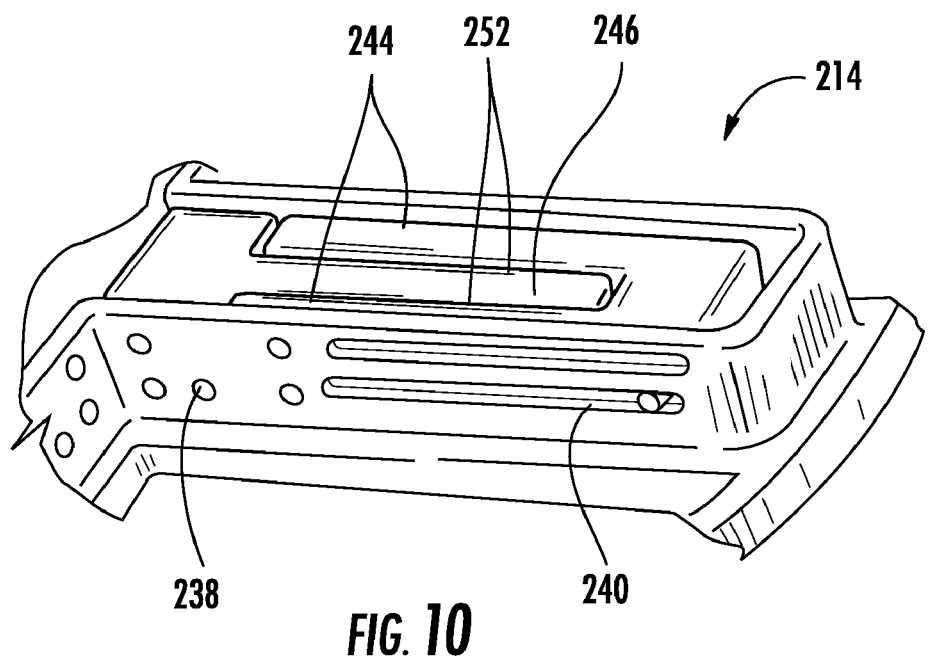
FIG. 10 is a perspective view of the oscillator 210 of FIG. 9 wherein the oscillator 210 is in a second position 214.
Figure 11:
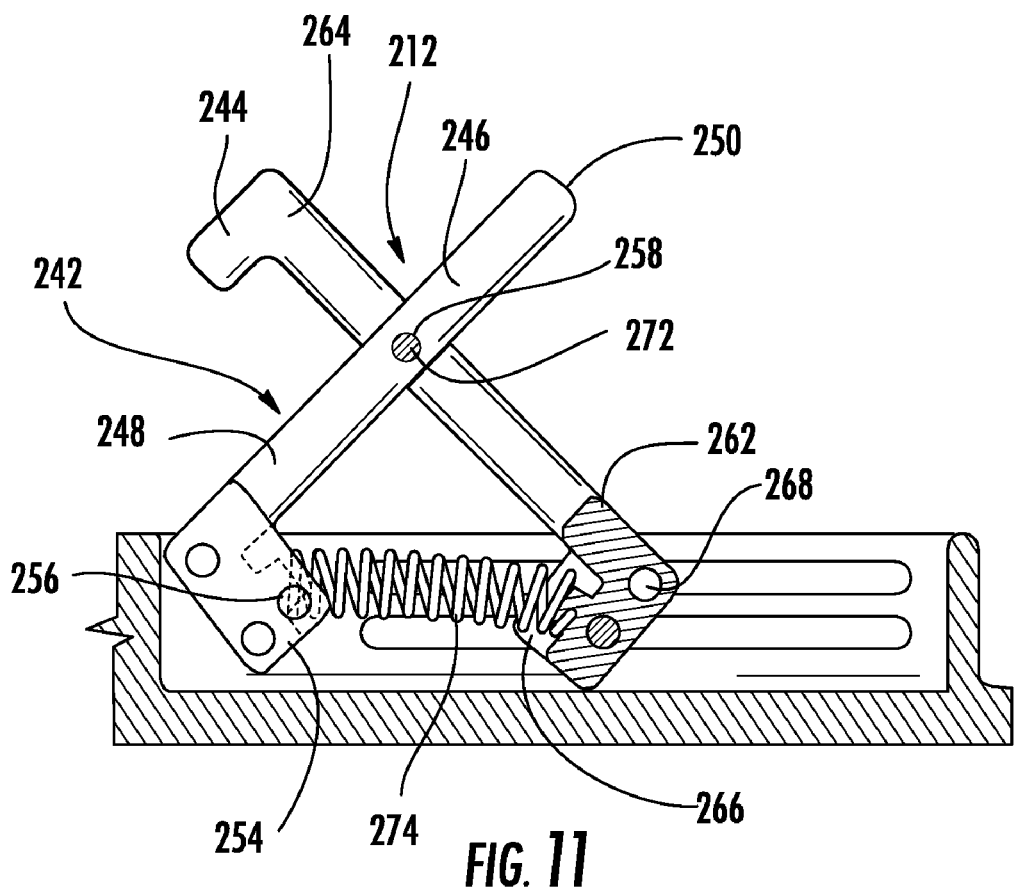
FIG. 11 is a side cross-sectional view of the oscillator 210 of FIG. 9.
Figure 12:
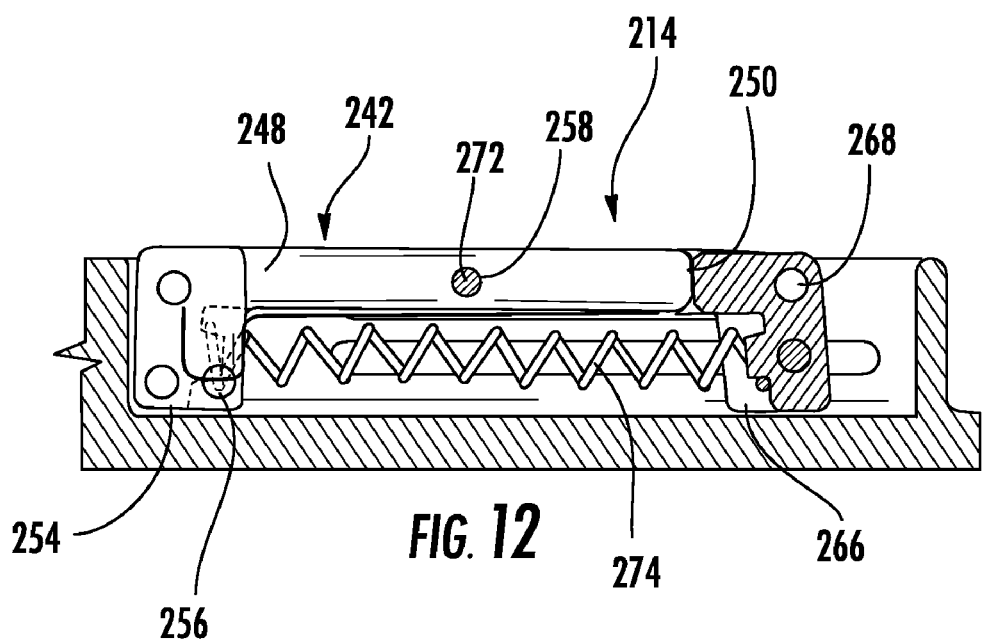
FIG. 12 is a side cross-sectional view of the oscillator 210 of FIG. 10.
Figure 13:
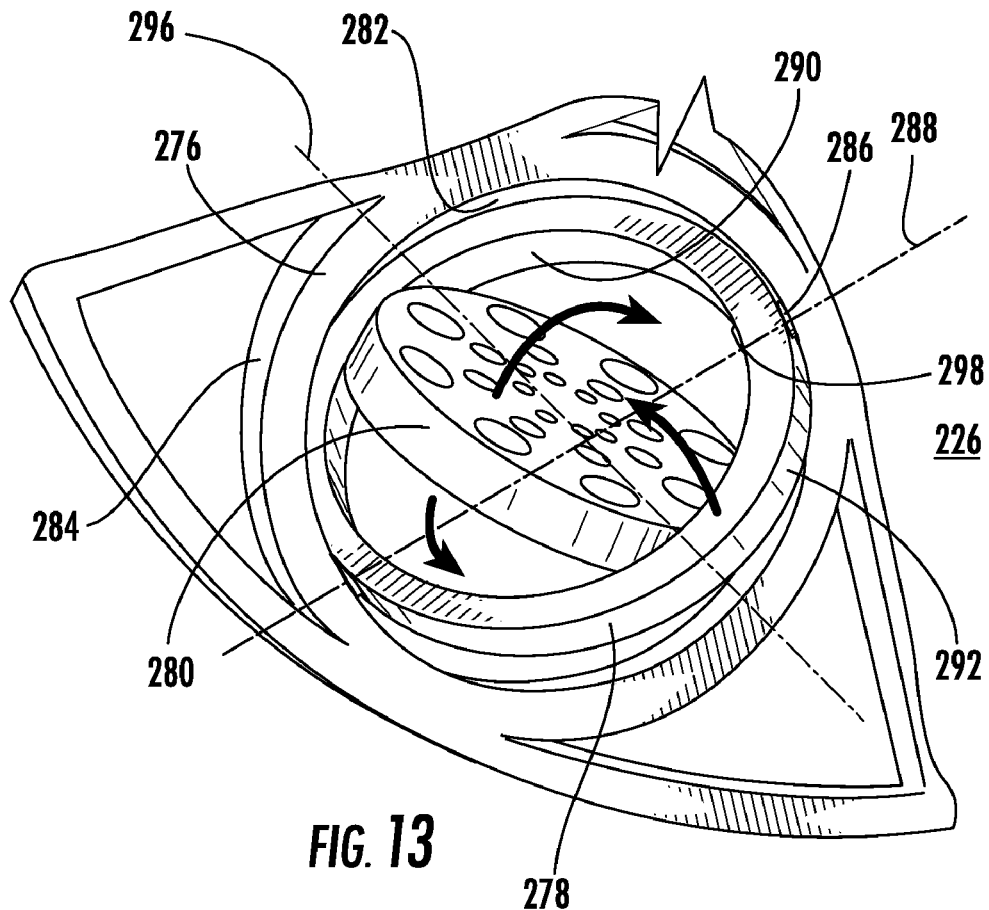
FIG. 13 is a partial perspective view of the rim assembly 200 of FIG. 7 featuring another type of oscillator 226.
Figure 14:
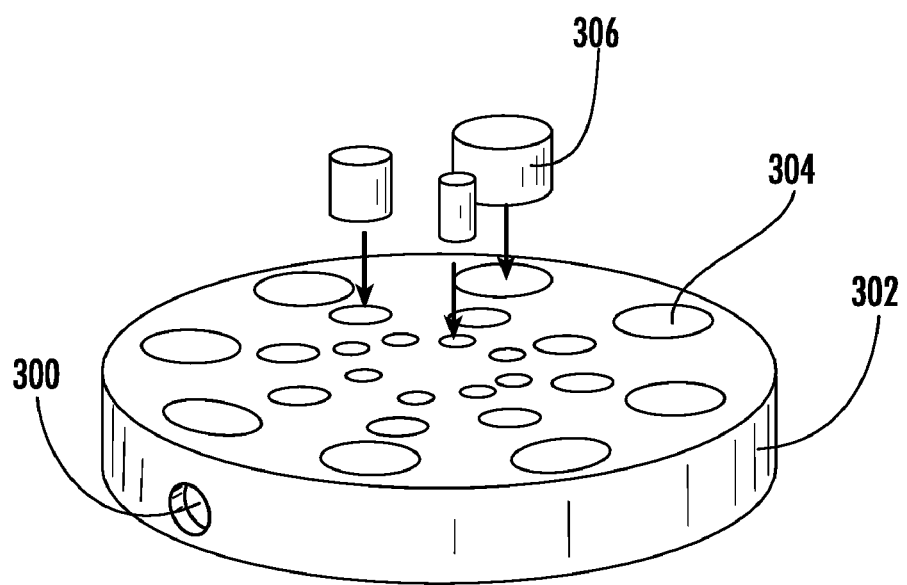
FIG. 14 is a perspective view of a disk 280 of the oscillator 226 of FIG. 13 wherein cylindrical weights are shown being installed in the disk 280.

A rim assembly 200 in accordance with a second embodiment of the present invention will now be described in detail with reference to FIGS. 7-14. In this respect, FIG. 7 is a perspective view of the rim assembly 200; FIG. 8 is a closer perspective view of the wheel cover of the rim assembly 200; FIG. 9 is a perspective view of a first type of oscillator 210 of the rim assembly 200, wherein the oscillator 210 is in a first position 212; FIG. 10 is a perspective view of the oscillator 210 in a second position 214; FIG. 11 is a side cross-sectional view of the oscillator 210 in the first position 212; FIG. 12 is a side cross-sectional view of the oscillator 210 in the second position 214; FIG. 13 is a partial perspective view of the rim assembly 200 featuring a second type of oscillator 226; and FIG. 14 is a perspective view of a disk 280 of the second type of oscillator 226 wherein cylindrical weights are shown being installed in the disk 280.

In accordance with the second embodiment, the rim assembly 200 includes a peripheral rim portion 202 on which a tire may be mounted in a conventional manner. The rim assembly 200 also includes a central rim portion having lug holes for receipt therethrough of lug studs for mounting of the central rim portion to a hub of an axle of an automobile. The mounting preferably is accomplished with lug nuts. While not shown, such mounting of a central rim portion to an axle hub is conventional and is disclosed, for example, in FIG. 3 of Clifford, which publication has been incorporated herein by reference. Furthermore, while the rim assembly 200 is intended to be used with an automobile, it will be understood by the Ordinary Artisan that various embodiments of the invention are applicable to any wheeled vehicle including, for example, and not by way of limitation: a motorcycle; an all terrain vehicle (ATV); a bicycle; a trailer; and a golf cart.

The rim assembly 200 further includes a wheel cover 208 that is disposed in covering relation to the central rim portion and the mounting of the rim assembly 200 to an axle hub. The wheel cover 208 is mounted in fixed disposition relative to the peripheral rim portion 202 and, consequently, rotates in unison therewith during rotation of a tire. A central axial opening 216 shown in FIGS. 7 and 8 extends completely through the wheel covering 208, and the wheel cover 208 may be attached to a central portion of the rim assembly 200 by extending a fastener (not shown) through the central axial opening. Alternatively, the wheel cover 208 may be fastened to a circumferential edge 220 of the peripheral rim portion 202. While not shown, such mounting of a wheel cover to a circumferential edge of a peripheral rim portion is conventional and is disclosed, for example, in FIG. 6 of Hsiao, which patent has been incorporated herein by reference. In either scenario, the wheel cover 208 is fixed for rotation with the peripheral rim portion 202 and tire mounted thereon.

The wheel cover 208 includes an intersecting pair of generally planar, rectangular cross members 218. The pair of cross members 218 are orthogonally disposed and are symmetrically oriented about the center axial opening 216 of the wheel cover 208. The pair of cross members 218 are bounded by and integral with a circumferential edge portion 222 of the wheel cover 208, and the pair of cross members 218 form the predominant structural aspect of the wheel cover 208 by which the oscillators 210,226 of the rim assembly 200 are supported. In this respect, the circumferential edge portion 222 and the pair of cross members 218 define four openings 224 disposed in four quadrants of the wheel cover 208. Each opening 224 includes an oscillator 226 mounted therein and supported by the pair of cross member 218. Each cross member 218 further supports a pair of oscillators 210 on a surface thereof. The two different types of oscillators 210,226 are described in detail below.

A perimeter wall 228 extends around the collective periphery of the pair of cross members 218 and an open central area 230 located at the point of bisection of the pair of cross members 218. The perimeter wall 228 of the cross members 218 define areas 232 wherein the oscillators 210 are received. Each of the four receiving areas 232 is identical and, therefore, only one will be described in detail.

The receiving area 232 has a proximal end 234, a distal end 236, with the proximal end 234 being adjacent the central area 230 and the distal end 236 being adjacent the circumferential edge portion 222 of the wheel cover 208. Further, the receiving area 232 is bounded on its distal end 236 and its radially extending sides by the perimeter wall 228. Moreover, the perimeter wall 228 defines two identical side perimeter walls 239 of the receiving area 232 each having a plurality of holes 238 disposed therethrough at the proximal end 234 of the receiving area 232. In the present embodiment, three holes are disposed through the side perimeter walls 239. In addition, each side perimeter wall 239 defines a pair of coextensive slots 240 aligned one on top of the other that extend from the distal end 236 of the receiving area to the proximal end 234 near the plurality of holes 238.

The oscillator 210 that is received within the area 232 includes a first scissor element 242 that is pivotably connected to a second scissor element 244. As discussed in detail below, the first and second scissor elements are operatively interconnected by a hinge pin 270 for scissor-like movement.

The first scissor element 242 includes a single elongate projection or finger 246 having a first end 248, a second end 250 and opposing sides 252. The first scissor element 242 further includes a pair of connection members 254 disposed on opposing sides 252 thereof at the first end 248 thereof. The pair of connection members 254 each has one or more holes 256 disposed therethrough, with the respective holes 256 of the pair of connection members 254 being aligned with one another. As illustrated, each pair of connection members 254 has three holes. The pair of connection members 254 are pivotally connected to the side perimeter walls 239 and, more particularly, a single pin 272 extends through one of the holes 238 of each side perimeter walls 239 and one of the holes 256 of each of the connection members 254. The pin 272 secures the connection members 254 to the side perimeter walls in pivotable disposition relative thereto. Moreover, any of the holes 238 may be selected, as desired, for extension of the pin 272 and mounting of the first scissor element 242. The first scissor element 242 also includes a central aperture 258 disposed therethrough that is generally positioned centrally along the length of the finger 246 between the ends 248,250 thereof.

The second scissor element 244 includes a pair of elongate projections or fingers 260 in spaced parallel relation to one another. Each finger 260 has a first end 262 and a second end 264. The second scissor element 244 further includes a pair of connection members 266 mounted at the first ends 262 of the pair of fingers 260. Similar to the pair of connection members 254 of the first scissor element 242, each of the pair of connection members 266 has one or more holes 268 disposed therethrough with the respective holes 268 of the pair of connection members 266 being aligned with one another. As illustrated, each pair of connection members 266 has three holes 268. The pair of connection members 266 are pivotally connected to the side perimeter walls 239 and, more particularly, a single pin 272 extends through one of the slots 240 of each side perimeter walls 239 and one of the holes 268 of each of the connection members 266. The pin 272 secures the connection members 266 to the side perimeter walls 239 in both pivotable and slidable disposition relative thereto. Thus, the second scissor element 244 may pivot in relation to the side perimeter walls 239 and may also slide axially along the length of the side perimeter walls 239. Moreover, any of the holes 268 may be selected, as desired, for extension of the pin 272 and the mounting of the second scissor element 244. The pair of connection members 266 further includes a pair of central apertures 270 disposed therethrough and positioned centrally along the length of the fingers 260 between the ends 262,264 thereof.

The first and second elements 242,244 of the protuberance 210 fit together in a similar manner as puzzle pieces fit together, with the finger 246 of the first scissor element 242 being received and fitting within the space between the pair of fingers 260 of the second scissor element 244. In this interlocking disposition, the pair of central apertures 270 of the second scissor element 244 align with the central aperture 258 of the first scissor element 242 and a pin 272 extends through the apertures 258,270 to pivotally connect together the first and second elements 242,244.

In order to bias the scissor elements 242,244 into a particular position of the oscillator 210, i.e., the first position 212, a spring 274 is interconnected between the first end 248 of the first scissor element 242 and the first end 262 of the second scissor element 244. The spring 274 may be a coil spring and exists in an extended state in its disposition between the first and second ends 248,262 so as to bias the oscillator into the first position 212 as shown, for example, in FIGS. 9 and 11.

When the oscillator 210 is in the first position 212, the first end 248 of the first scissor element 242 is disposed adjacent the proximal end 234 of the receiving area 232, and the finger 246 protrudes outwardly from the wheel cover 208. Similarly, the first end 262 of the second scissor element 244 is disposed generally centrally along the slots 240 of the side perimeter walls 239, and the pair of fingers 260 also protrude outwardly from the wheel cover 208.

Conversely, when the oscillator 210 is disposed in the second position 214, as shown, for example, in FIGS. 10 and 12, the first and second scissor elements 242,244 retract within the receiving area 232 to lie generally flush with the top edge of the perimeter wall 228. Thus, in the second position 214, no portion of the oscillator 210 protrudes from the wheel cover 208. Also in the second position 214, the first end 262 of the second scissor element 244 lies adjacent the circumferential edge portion 222 of the wheel cover 208, i.e., the first end 262 has moved outwardly along the receiving area 232 in transitioning from the first position 212 to the second position 214 of the oscillator 210. In the second position 214, the spring 274 is extended further relative to its extension when the oscillator 210 is in the first position 212.

As mentioned previously, the wheel cover 208 further includes another type of oscillator 226 that is different in design from the oscillator 210. Each oscillator 226 is disposed within an opening 224 of the wheel cover 208 and is supported therein by the cross members 218. Each of the oscillators 226 is identical and, therefore, only one will be described in detail.

The oscillator 226 includes a first support ring 276, a second support ring 278, and a disk 280, with the second support ring 278 interconnecting the first support ring 276 and the disk 280. The support ring 276 is integrally formed with the cross members 218 and circumferential edge portion 222 of the wheel cover 208, with a horizontal plane of the ring 276 being aligned with the horizontal plane of the wheel cover 208. The first support ring 276 has an inner surface 282 and an outer surface 284, with a first pair of cylindrical connection members 286 extending from the inner surface 282 thereof. The pair of cylindrical connection members 286 are coaxially disposed along a first axis 288 and extend through coaxial openings 298 in the second support ring 278, thereby mounting the second support ring 278 to the first support ring and, indirectly, to the wheel cover 208, and, further, thereby mounting the second support ring 278 to the first support ring 276 for rotational movement about the first axis 288.

Similarly, the second support ring 278 has an inner surface 290 and an outer surface 292, with a second pair of cylindrical connection members (not shown) extending from the inner surface 290 thereof and coaxially disposed along a second axis 296. The second axis 296 is substantially orthogonal to the first axis 288. These cylindrical connection members extend respectively through coaxial openings 300 in a peripheral wall 302 of the disk 280, thereby mounting the disk 280 to the second support ring 278 and, indirectly, to the wheel cover 208, and, further, thereby mounting the disk 280 to the second support ring 278 for rotational movement about the second axis 296 and, indirectly, for rotational movement about the first axis 288. As will be appreciated by the Ordinary Artisan, the support ring 278 thus serves as a gimbal interconnecting the disk 280 to the wheel cover 208.

The disk 280 also includes a plurality of symmetrically arranged cylindrical recesses 304 of varying sizes disposed therein. Weights 306 may be installed in frictional fit within the apertures 304, as desired. The combination of the cylindrical recesses 304 and the weights 306 results in asymmetrical weighting of the disk 308 which changes the center of gravity of the disk 280 such that the center of gravity is offset to one or more of the axes 288,296.

Operation of the Second Embodiment

In operation of oscillators 210, movement of each oscillator 210 from the first position 212 toward the second position 214 generally is caused by rotation of the wheel cover 208. Specifically, during rotation of the wheel cover 208, centrifugal force acts upon the first and second scissor elements 242,244 of the oscillator 110. At a first threshold angular velocity, the magnitude of the centrifugal force will be sufficient to begin to cause the scissor elements 242,244 to slide outwardly in the radial direction causing them to retract toward the receiving area 232 of the wheel cover 208. This motion is accomplished by sliding of the second scissor element within the slots 240 and pivoting of the first and second scissor elements 242,244 relative to one another about the hinge pin 270. This movement results in extension of the spring 274, which naturally tends to resist such movement.

At a second threshold angular velocity, the magnitude of the centrifugal force will be sufficient to cause the oscillator 210 to reach the second position 214, wherein the scissor elements 242,244 will be fully retracted within the receiving area 232 and will lie flush with the perimeter wall 228. For purposes of commercial embodiments of the rim assembly 200 of the present invention, it is preferred that the first and second threshold angular velocities correspond to vehicular speeds of between approximately 10 miles per hour to 30 miles per hour.

When the second threshold angular velocity is no longer maintained or exceeded, the magnitude of the centrifugal force will no longer be sufficient to maintain the extent of the extension of the spring 274 in the second position 214 and, consequently, the spring 274 will begin to retract. Retraction of the spring 274 draws the ends 248,262 of the scissor elements 242,244 together and protracts the ends 250,264 outwardly away from the wheel cover 208.

In view of the foregoing, it will be appreciated by the Ordinary Artisan that: when an automobile having a rim assembly 200 is at rest, each oscillator 210 generally will be disposed in the first position 212, i.e., protruding from a front side of the wheel cover 208; during acceleration of the vehicle, each oscillator of the rim assembly 200 will begin to retract toward the wheel cover 208 when a respective, particular speed is reached by the vehicle; and if and when a respective, second particular speed is achieved, each oscillator 210 will be fully retracted within the wheel cover 208. Moreover, it will be appreciated that, during the two respective, particular speeds, each oscillator 210 will be partially extended to varying degrees depending on the speed of the vehicle.

It will also be appreciated by the Ordinary Artisan that, because each oscillator 210 includes its own respective spring 274, each oscillator 210 can be customized to begin retracting and fully retract at speeds different from the other oscillators of the same rim assembly 200. Indeed, in embodiments wherein individual springs are used to actuate individual oscillators, the predetermined threshold speeds for individual oscillators may be varied within a single rim assembly. Specifically, the particular speeds (and, thus, the threshold angular velocities) may be varied from oscillator 210 to oscillator 210 of the same rim assembly 200 based on the properties of each respective spring 274. A spring having a greater spring constant will require higher threshold levels, and a spring having a lower spring constant will require lower threshold levels.

Like the rim assembly 100, further customization can be achieved by varying the spring 274 as between the different rim assemblies 200 of a vehicle.

The operation of the oscillators 226 is different from the operation of the oscillators 210 of the rim assembly 200 (and is different from the operation of the oscillators 110 of the rim assembly 100). With respect to oscillators 226, each disk 280 of each oscillator 226 is uninhibited in its rotation both about the first axis 288 and the second axis 296 and, thus, the disk 280 will tend to rotate in an unpredictable manner and will not transition between first and second defined positions as with the aforementioned operations of the oscillators 110,210. In common with the aforementioned operations of the oscillators 110,210, however, is the characteristic that the disk 280 nevertheless will rotate away from and then back to the wheel cover 208 during rotation of the rim assembly 200. As such, the oscillators 226 still "oscillate" between protracted and retracted positions with respect to the front side of the wheel cover 208 and, thus, represent a form of oscillators.

Furthermore, it will be appreciated by the Ordinary Artisan that the rotation of the disk 280 will result from the rotation of the rim assembly 200 (and, specifically, wheel cover 208) when the location of the center of gravity of the disk 280 is not inline with one or both of the pivot axes 288,296. Adjustment of the center of gravity of the disk 280 is accomplished by installation and/or removal of cylindrical weights 306 from the cylindrical recesses 304 of the disk 280, which asymmetrically weights the disk 280.

Third Embodiment

Figure 15:
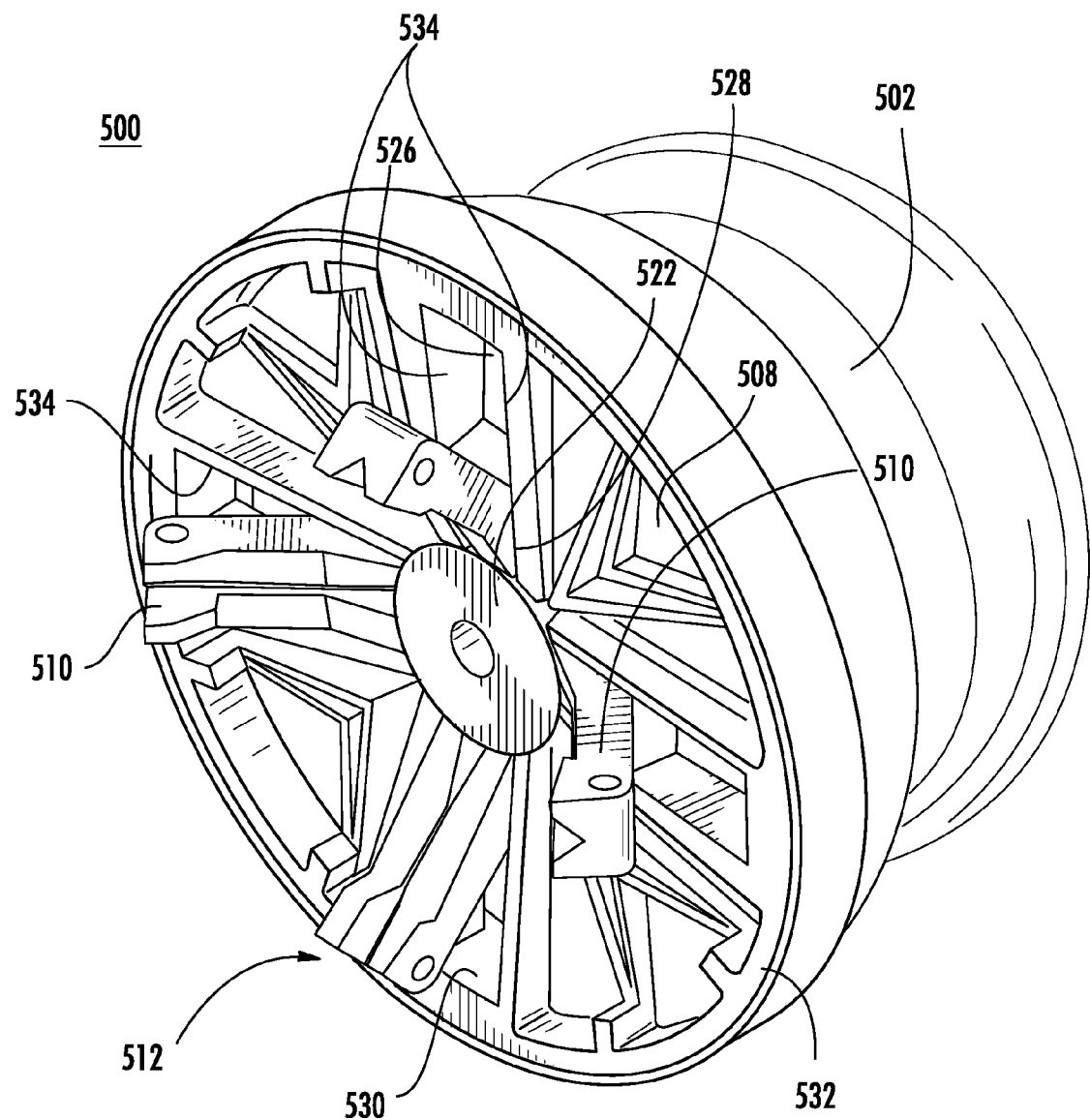
FIG. 15 is a perspective view of a rim assembly 500, wherein each oscillator 510 of the rim assembly 500 is illustrated in a respective first position 512.
Figure 16:
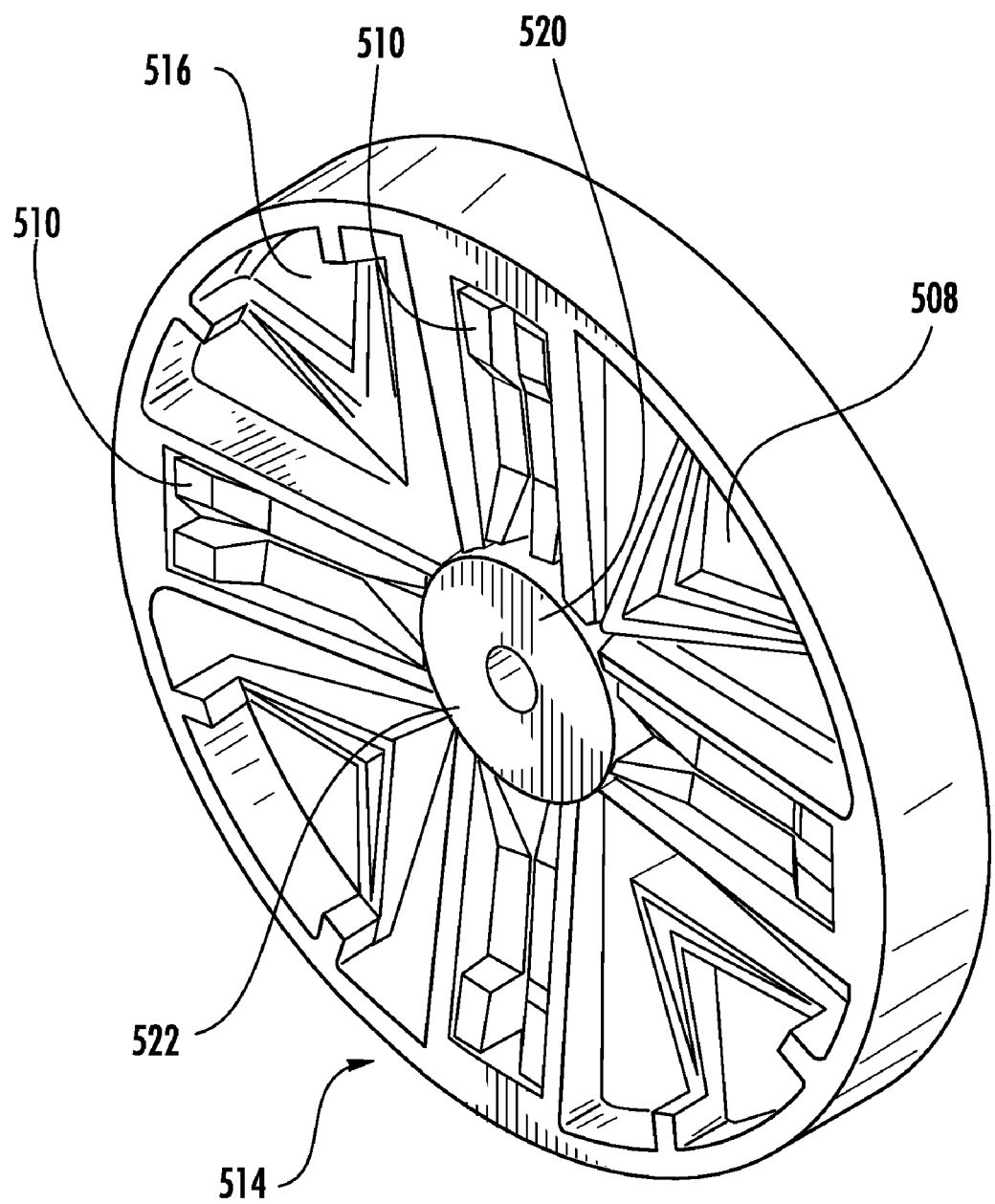
FIG. 16 is a perspective front view of a wheel cover 508 of the rim assembly 500 of FIG. 15, wherein each oscillator 510 of the rim assembly 500 is illustrated in a respective second position 514.
Figure 17:
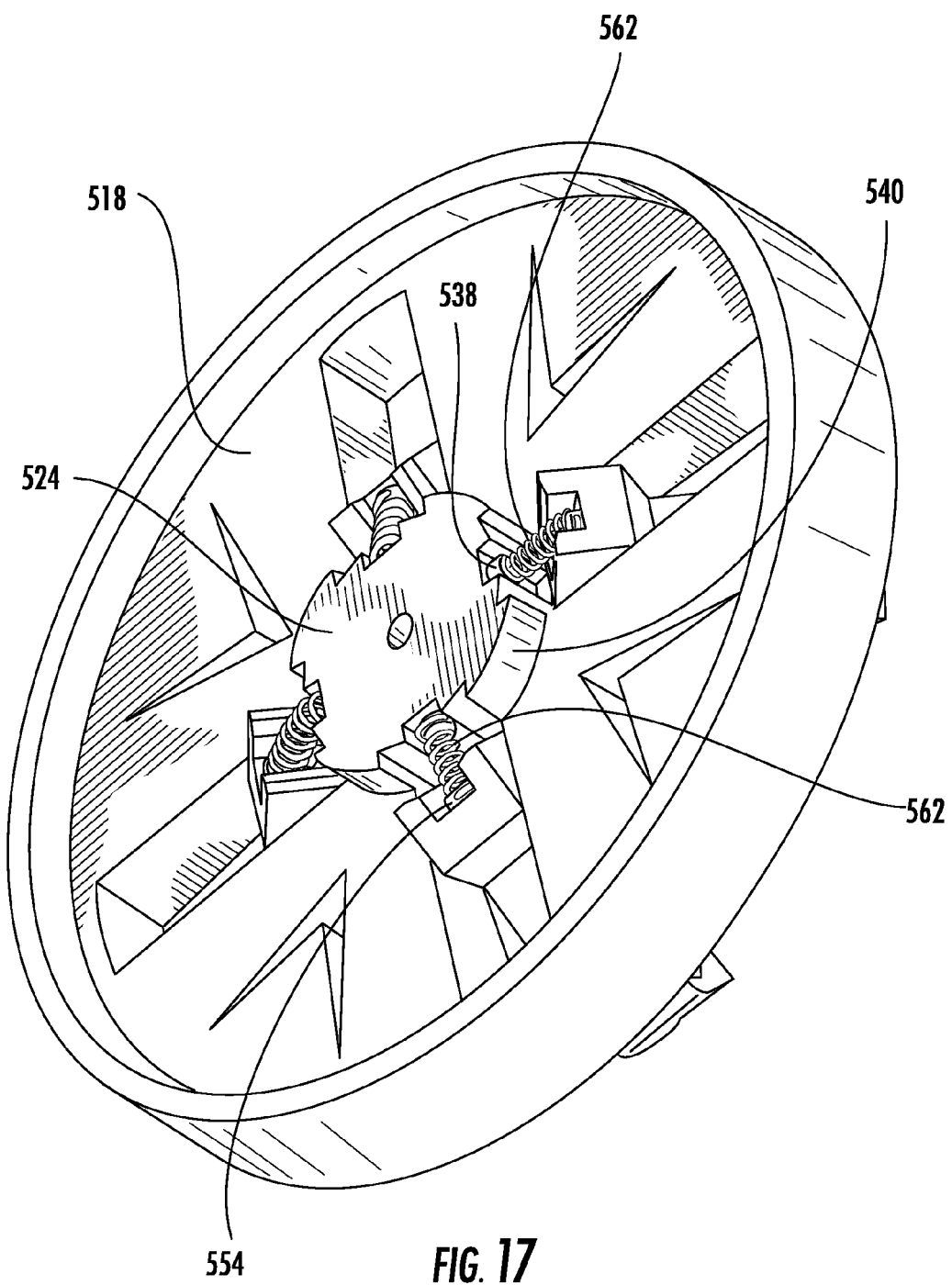
FIG. 17 is a perspective rear view of the wheel cover 508 of FIG. 16, wherein each oscillator 510 is illustrated in the first position 512.
Figure 18:
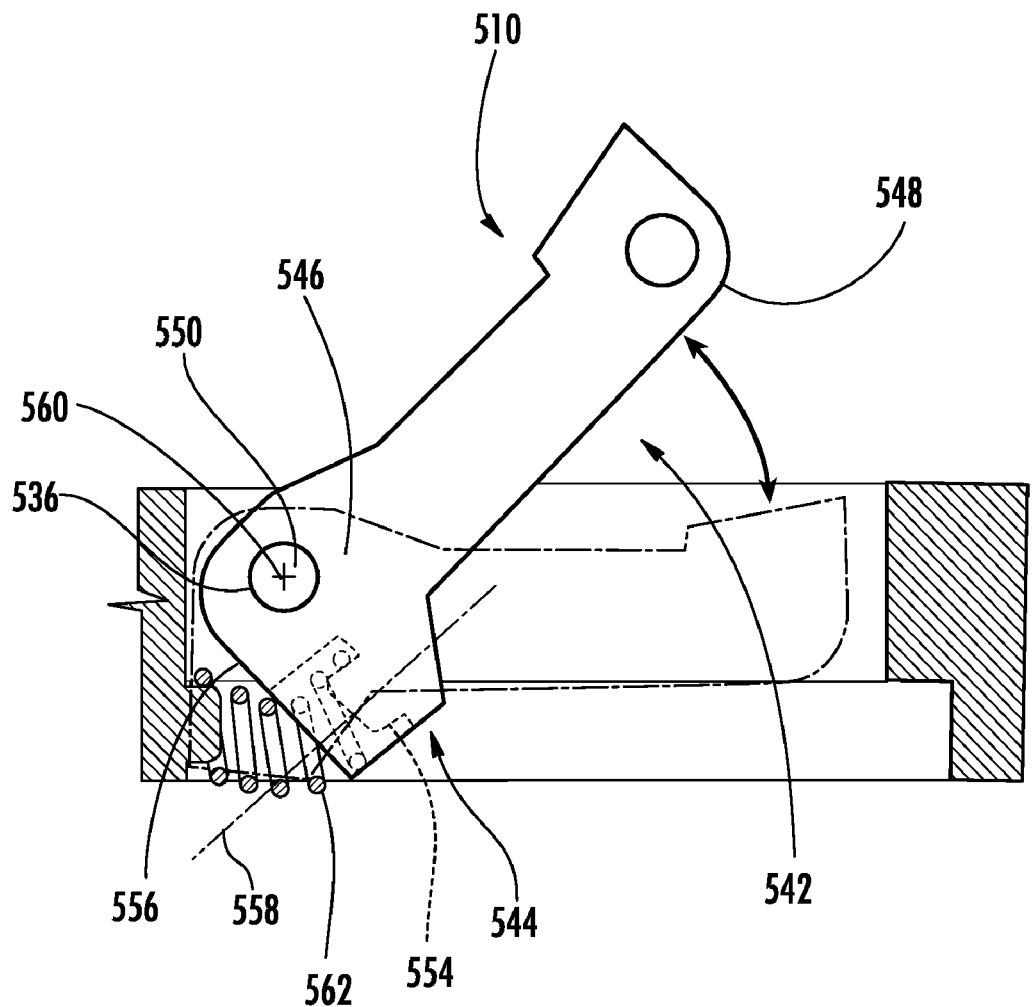
FIG. 18 is a partial cross-sectional view of an oscillator 510 in the first position 514.

A rim assembly 500 in accordance with a third embodiment of the present invention will now be described in detail with reference to FIGS. 15-18. In this respect, FIG. 15 is a perspective view of a rim assembly 500, wherein each oscillator 510 of the rim assembly 500 is illustrated in a respective first position; FIG. 16 is a perspective front view of a wheel cover 508 of the rim assembly 500 of FIG. 15, wherein each oscillator 510 of the rim assembly 500 is illustrated in a respective second position; FIG. 17 is a perspective rear view of the wheel cover 508, wherein each oscillator 510 of the rim assembly 500 is illustrated in a respective second position 514; and FIG. 18 is a partial cross-sectional view of an oscillator 510 in the second position.

The rim assembly 500 includes a peripheral rim portion 502 on which a tire may be mounted in conventional manner. The rim assembly 500 also includes a central rim portion having lug holes for receipt therethrough of lug studs for mounting of the central rim portion to a hub of an axle of an automobile. The mounting preferably is accomplished with lug nuts. While not shown, such mounting of a central rim portion to an axle hub is conventional and is disclosed, for example, in FIG. 3 of Clifford, which publication already has been incorporated herein by reference. Furthermore, while the rim assembly 500 is intended to be used with an automobile, it will be understood by the Ordinary Artisan that various embodiments of the invention are applicable to any wheeled vehicle including, for example, and not by way of limitation: a motorcycle; an all terrain vehicle (ATV); a bicycle; a trailer; and a golf cart.

The rim assembly 500 further includes a wheel cover 508 that is disposed in covering relation to the central rim portion and the mounting of the rim assembly 500 to an axle hub. The wheel cover 508 is mounted in fixed disposition relative to the peripheral rim portion 502 and, subsequently, rotates in unison therewith during rotation of a tire mounted on the rim assembly 500. A central axial opening shown in FIGS. 15-17 extends completely through the rim assembly including the wheel covering 508, and the wheel cover 508 may be attached to a central portion of the rim assembly 500 by extending a fastener (not shown) through the central axial opening. Alternatively, the wheel cover 508 may be fastened to a circumferential edge of the peripheral rim portion 502. While not shown, such mounting of a wheel cover to a circumferential edge of a peripheral rim portion is conventional and is disclosed, for example, in FIG. 6 of Hsiao, which patent already has been incorporated herein by reference. In either scenario, the wheel cover 508 is fixed for rotation with the peripheral rim portion 502 and any tire mounted thereon.

The wheel cover 508 is round and includes a front side 516 and a back side 518. The wheel cover 508 includes a central circular area 520 having a front surface 522 and a back surface 524 through which the central axial opening extends. The wheel cover 508 also includes a plurality of generally rectangular, radially arranged recesses 526 disposed there through for receiving an oscillator 510 (described below). The recesses 526 have a proximal end 528 and a distal end 530, with the proximal end 528 located adjacent the central circular area 520 and the distal end 530 located adjacent the peripheral edge portion 532 of the wheel cover 508. A pair of side walls 534 define sides of each recess 526. A pair of cylindrical recesses 536, which are located at the proximal end 528 of each of the recesses 526, are disposed in the side walls 534 in coaxial relation to one another.

A portion of the central circular area 520 on the back side 518 of the wheel cover 508 includes four spring mounting posts 538 extending from a peripheral surface 540 thereof. Each of the mounting posts 538 is aligned with one of the four recesses 526. The number of mounting posts 538 corresponds to the number of recesses 526 (and oscillators 510) and, therefore, the number of mounting posts 538 will vary depending upon the number of recesses 526.

The rim assembly 500 includes a plurality of oscillators 510 disposed on and radially arranged about a center of the wheel cover 508. In the rim assembly 500, four oscillators 510 are shown; however, the number of oscillators may be more or less, as desired. Each oscillator 510 is dimensioned to be received in one of the plurality of recesses 526 and is pivotally connected with the side walls 534 when disposed within the recess 526. Each oscillator 510 is identical and, therefore, only one will be described in detail.

The oscillator 510 includes an extension portion 542 and an actuation portion 544. The extension portion 542 is elongate and includes a proximal end 546 and a distal end 548. The actuation portion 544 is integrally formed with the proximal end 546 of the extension portion 542 and extends generally orthogonally to the extent of the extension portion 542. The actuation portion 544 includes a pair of cylindrical projections 550 disposed on opposite sides thereof. The pair of cylindrical projections 550 are dimensioned to fit within the pair of cylindrical recesses 536 of the side walls 534. Such connection between the oscillator 510 and the side walls 534 allows the oscillator 510 to pivot about an axis 560 of the pair of cylindrical projections 550. The actuation portion 544 also includes a cylindrical spring mounting post 554. The mounting post 554 is located near a bottom surface 556 of the actuation portion 544 and is arranged such that an axis thereof 558 is orthogonal to the axis 560 of the pair of cylindrical projections 550 of the actuation portion 544.

When the oscillator 510 is disposed within the recess 526 and connected to the wheel cover 508, the mounting post 554 of the oscillator 510 is disposed in a pairing relationship with one of the mounting posts 538 of the wheel cover 508. A compression coil spring 562 is attached at opposing ends thereof to the mounting post 554 of the oscillator 510 and to the mounting post 538 of the wheel cover 508, respectively, and biases the oscillator toward the first position 512. When the oscillator 510 is in the first position 512, the extension portion 542 thereof projects away from the front side 516 of the wheel cover 508. In contrast, when the oscillator 510 is in the second position 514, the extension portion 542 thereof lies substantially within the recess 526 and lies flush to the front side 516 of the wheel cover 508. Furthermore, in this position, the distal end 548 of the extension portion 542 is located adjacent the distal end 530 of the recess 526. Of course, when the oscillator 510 moves from the first position 512 toward the second position 514, the spring 562 is compressed as the actuation portion 544 of the oscillator 510 pivots toward the central circular area 520 of the wheel cover 508.

Operation of the Third Embodiment

In operation, movement of each oscillator 510 from the first position 512 toward the second position 514 generally is caused by rotation of the wheel cover 508. Specifically, during rotation of the wheel cover 508, centrifugal force acts upon the distal end 548 of the extension portion 542 of each of the oscillators 510.

At a first threshold angular velocity, the magnitude of the centrifugal force will be sufficient to begin to cause the distal end 548 of the extension portion 542 of a particular oscillator 510 to retract within the recess 526. This motion is accomplished by pivoting of the oscillator 510 about the pair of cylindrical recesses 536, which mounts the oscillator 510 on the wheel cover 508. Of course, this motion compresses the respective spring 562 of the oscillator 510, which tends to resist such pivoting by the centrifugal force.

At a second threshold angular velocity, the magnitude of the centrifugal force will be sufficient to cause the oscillator 510 to move into the second position 514, wherein the extension portion 548 of the oscillator 510 will completely be within the recess 526. For purposes of commercial embodiments of the rim assembly 500, it is preferred that the first and second threshold angular velocities correspond to vehicular speeds of between approximately 10 miles per hour to 30 miles per hour.

As long as at least the second threshold angular velocity is maintained, the centrifugal force will be greater than the force of the spring 562, and the oscillator 510 will remain in the second position 514 retracted within recess 526. If and when the second threshold angular velocity is not maintained, then the force of the spring 562 once again will overcome the centrifugal force, and the spring 562 will begin to transition the oscillator 510 back to the first position 512.

In view of the foregoing, it will be appreciated by the Ordinary Artisan that: when an automobile having the rim assembly 500 is at rest, each oscillator 510 generally will be disposed in the first position 512, i.e., protruding from the front side 516 of the wheel cover 508; during acceleration of the vehicle, each oscillator 510 will begin to retract into the wheel covers when a respective particular speed is reached by the vehicle; and if and when a respective second particular speed is achieved, each oscillator will come to be fully retracted within its respective recess 526 in the wheel cover 508. Moreover, it will be appreciated that, during the two respective particular speeds, an oscillator will be partially extended to varying degrees depending on the speed of the vehicle.

It will also be appreciated by the Ordinary Artisan that the particular speeds (and, thus, the threshold angular velocities) may be varied based on the properties of the spring 562 of the rim assembly 500. A spring 562 having a greater spring constant will require higher threshold levels, and a spring 562 having a lower spring constant will lower threshold levels.

Similar variation can be achieved by altering the weight of the distal end 548 of the extension portion 542 of each of the oscillators 510. In this respect, the distal end 548 of each extension portion 542 of each of the oscillators 510 includes two cylindrical recesses that are adapted to receive therein one of a plurality of different cylindrical weights (not shown) in tight frictional fit. By selectively installing weights in the cylindrical recesses of the oscillators 510, the threshold angular velocities of each oscillator may be altered. The oscillators 510 may be weighted similarly or dissimilarly.

Because the threshold angular velocities may be so varied, a user can fine tune each rim assemblies 500. Moreover, a user may select to have all four rim assemblies actuate in similar fashion or differently, or any combination thereof. Such customizability is advantageous and provides yet further, individualized customization of a vehicle's wheels for cruising and the like according to one's desires.

Additional Variants and Features

As will not be apparent from the foregoing, each of the various embodiments of the present invention provides unique visual effects arising from axial motion away from and back toward a wheel during rolling movement of the wheel. Additional features of a rim assembly in accordance with one or more embodiments of the present invention further are contemplated. For instance, the oscillators may extend beyond the circumferential edge portion of the wheel cover and extend over a tire that is mounted on the peripheral rim portion when in the second position. Such a design may enhance the visual effect created by the rim assembly. Additionally, it is contemplated that all or part of an oscillator may exhibit additional types of motion during transition from the first position to the second position, such as a twisting motion during pivoting. For example, the oscillator may rotate or twist as it retracts toward the wheel cover. It is also contemplated that the motion of the oscillator may be dampened for a delayed effect. Thus, for example, movement of an oscillator from the second position and back to the first position may be delayed until after a vehicle has come to a stop.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. An assembly, comprising:
   (a) a wheel cover; and
   (b) an oscillator attached to said wheel cover and configured to move back and forth between a first position and a second position based on rotation of the wheel cover about an axis thereof;
   (c) a spring member that biases said oscillator toward the first position from the second position;
   (d) wherein
      (i) said oscillator is configured to protract axially away from said wheel cover when moving from the second position toward the first position and to retract axially toward said wheel cover when moving from the first position toward the second position, and
      (ii) said oscillator is configured to move from the first position toward the second position based on centrifugal force.

2. The assembly of claim 1, further comprising a rim including a peripheral rim portion for the mounting of a tire, wherein the wheel cover is affixed to said rim.

3. The assembly of claim 1, wherein said oscillator is one of a plurality of oscillators and wherein said spring member biases each of the oscillators.

4. The assembly of claim 1, wherein said oscillator is one of a plurality of oscillators and wherein said spring member is one of a plurality of spring members, each spring member biasing a respective one of the plurality of oscillators.

5. An assembly, comprising:
   (a) a wheel cover; and
   (b) an oscillator attached to said wheel cover and configured to move back and forth between a first position and a second position based on rotation of the wheel cover about an axis thereof;
   (c) a spring member that biases said oscillator toward the first position from the second position;
   (d) wherein
      (i) said oscillator is configured to protract axially away from said wheel cover when moving from the second position toward the first position and to retract axially toward said wheel cover when moving from the first position toward the second position, and
      (ii) said oscillator is configured such that when the wheel cover is at rest, said oscillator is in the first position, and further configured to transition to the second position as a result of an increase in an angular velocity of the wheel cover.

6. The assembly of claim 5, further comprising a rim including a peripheral rim portion for the mounting of a tire, wherein the wheel cover is affixed to said rim.

7. A vehicle including the assembly of claim 5.

8. A rim assembly, comprising:
   (a) a rim and a wheel cover affixed to said rim; and
   (b) an oscillator attached to said wheel cover and configured to move back and forth between a first position and a second position based on rotation of the wheel cover about an axis thereof;
   (c) a spring member that biases said oscillator toward the first position from the second position;
   (d) wherein
      (i) said oscillator is configured to protract axially away from said wheel cover when moving from the second position toward the first position and to retract axially toward said wheel cover when moving from the first position toward the second position, and
      (ii) said rim assembly is configured such that when said wheel cover is affixed to a rim and said oscillator is in the first position, said oscillator extends axially outward from the wheel cover.

9. The rim assembly of claim 8, wherein said rim includes a peripheral rim portion for the mounting of a tire.

10. An assembly, comprising:
 (a) a wheel cover;
 (b) an oscillator attached to said wheel cover and configured to move back and forth between a first position and a second position based on rotation of the wheel cover about an axis thereof; and
 (c) a weight that is affixed to said oscillator;
 (d) a spring member that biases said oscillator toward the first position from the second position;
 (e) wherein said oscillator is configured to protract axially away from said wheel cover when moving from the second position toward the first position and to retract axially toward said wheel cover when moving from the first position toward the second position.

11. The assembly of claim 10, wherein said weight is removably affixed to said oscillator.

12. The assembly of claim 10, further comprising a rim including a peripheral rim portion for the mounting of a tire, wherein the wheel cover is affixed to said rim.

* * * * *